(12) United States Patent
Ock et al.

(10) Patent No.: US 11,277,278 B2
(45) Date of Patent: Mar. 15, 2022

(54) SMART HOME SERVICE SERVER AND CONTROL METHOD THEREFOR

(71) Applicant: Samsung Electronics Co., Ltd., Suwon-si (KR)

(72) Inventors: Hyun-Woo Ock, Suwon-si (KR); Sung Bin Im, Yongin-si (KR); Young Min Ko, Seoul (KR); Hyun Joong Kim, Suwon-si (KR); Hyun Jin Oh, Seongnam-si (KR); Young Seon Kong, Seoul (KR); Min Su Kim, Seoul (KR); Seok Min Bae, Suwon-si (KR); Suk Tae Choi, Suwon-si (KR); Jung Mo Yeon, Suwon-si (KR); Lye Suk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/778,801

(22) PCT Filed: Nov. 24, 2016

(86) PCT No.: PCT/KR2016/013660
§ 371 (c)(1),
(2) Date: May 24, 2018

(87) PCT Pub. No.: WO2017/091021
PCT Pub. Date: Jun. 1, 2017

(65) Prior Publication Data
US 2018/0351763 A1 Dec. 6, 2018

Related U.S. Application Data

(60) Provisional application No. 62/259,547, filed on Nov. 24, 2015.

(30) Foreign Application Priority Data

Nov. 24, 2016 (KR) ........................ 10-2016-0157660

(51) Int. Cl.
*H04L 12/28* (2006.01)
*H04L 29/06* (2006.01)
(Continued)

(52) U.S. Cl.
CPC ...... *H04L 12/2836* (2013.01); *H04L 12/2818* (2013.01); *H04L 12/2825* (2013.01);
(Continued)

(58) Field of Classification Search
CPC .............. G06F 17/241; G06F 3/0488; G06F 2009/4557; G06F 2009/45575;
(Continued)

(56) References Cited

U.S. PATENT DOCUMENTS 9,444,620 B1 * 9/2016 Murphy ................ H04L 9/0822
2002/0129264 A1 * 9/2002 Rowland ............. H04L 63/1416
726/26
(Continued)

FOREIGN PATENT DOCUMENTS

CN 103399530 A 11/2013
EP 2 938 022 A1 10/2015
(Continued)

OTHER PUBLICATIONS

European Search Report dated May 22, 2019; European Appln. No. 16 868 917.2-1218.
(Continued)

*Primary Examiner* — Yemane Mesfin
*Assistant Examiner* — Mon Cheri S Davenport
(74) *Attorney, Agent, or Firm* — Jefferson IP Law, LLP

(57) ABSTRACT

A smart home service which is capable of providing an environment in which calling a control command for a
(Continued)

device is available via a user terminal protocol to control between the device and a user terminal based on different type of protocol and a control method for the same. The smart home service server connecting at least one device operated based on a first protocol to at least one user terminal operated based on a second protocol, includes an application programming interface (API) controller configured to allow a control command for the at least one device to be called via the second protocol of the at least one user terminal; a filter configured to convert the called control command according to the first protocol; and a control command transmitter configured to transmit the control command converted according to the first protocol, to the at least one device.

3 Claims, 21 Drawing Sheets

(51) Int. Cl.
| | | |
|---|---|---|
| *H04W 12/06* | (2021.01) | |
| *H04W 12/08* | (2021.01) | |
| *H04W 4/70* | (2018.01) | |
| *H04L 69/08* | (2022.01) | |
| *H04L 67/125* | (2022.01) | |
| *H04L 69/18* | (2022.01) | |
| *H04L 67/12* | (2022.01) | |
| *H04L 67/56* | (2022.01) | |
| *H04W 12/71* | (2021.01) | |

(52) U.S. Cl.
CPC ...... *H04L 63/0815* (2013.01); *H04L 63/0876* (2013.01); *H04L 63/0884* (2013.01); *H04L 63/102* (2013.01); *H04L 67/125* (2013.01); *H04L 69/08* (2013.01); *H04W 4/70* (2018.02); *H04W 12/06* (2013.01); *H04W 12/08* (2013.01); *H04L 67/12* (2013.01); *H04L 67/28* (2013.01); *H04L 69/18* (2013.01); *H04W 12/71* (2021.01)

(58) Field of Classification Search
CPC . G06F 2009/45583; G06F 2009/45595; G06F 9/45558; H04L 51/066; H04L 51/38; H04L 67/36; H04L 43/10; H04L 63/0227; H04L 63/1408; H04L 41/12; H04L 41/145; H04L 43/50; H04L 63/1416; H04L 63/1433; H04L 63/1491; H04M 1/72547; H04M 1/7255; H04M 1/72552; H04M 1/72597; H04M 2250/60; H04W 12/06; H04W 4/12; H04W 4/16; H04W 4/14

See application file for complete search history.

(56) References Cited

U.S. PATENT DOCUMENTS

| | | | | |
|---|---|---|---|---|
| 2008/0019392 | A1* | 1/2008 | Lee | .......................... H04L 12/66 370/467 |
| 2008/0233983 | A1* | 9/2008 | Park | .................... H04L 12/2818 455/466 |

FOREIGN PATENT DOCUMENTS

| | | | |
|---|---|---|---|
| JP | 2007-312148 | A | 11/2007 |
| KR | 10-2014-0060793 | A | 5/2014 |
| KR | 10-1476667 | B1 | 1/2015 |
| WO | 2007/004755 | A1 | 1/2007 |
| WO | 2014/024484 | A1 | 2/2014 |
| WO | 2015/174560 | A1 | 11/2015 |

OTHER PUBLICATIONS

European Search Report dated Oct. 10, 2019, issued in European Application No. 16 868 917.2-1218.
Australian Search Report dated May 22, 2020; Australian Appln. No. 2016361086.
Chinese Office Action with English translation dated Aug. 19, 2020; Chinese Appln. No. 201680068775.X.
Fukuda et al.; Implementing Real-time Control Services of Networked Home Appliances; The Institute of Electronics, Information and Communication Engineers; IEICE Technical Report IN2008-33(2008-7); 2008; Japan.
Japanese Office Action with English translation dated Oct. 20, 2020; Japanese Appln. No. 2018-545794.
Chinese Office Action with English translation dated May 8, 2021; Chinese Appln No. 201680068775.X.
Indian Office Action dated Jun. 20, 2021; Indian Appln. No. 201817023066.

* cited by examiner

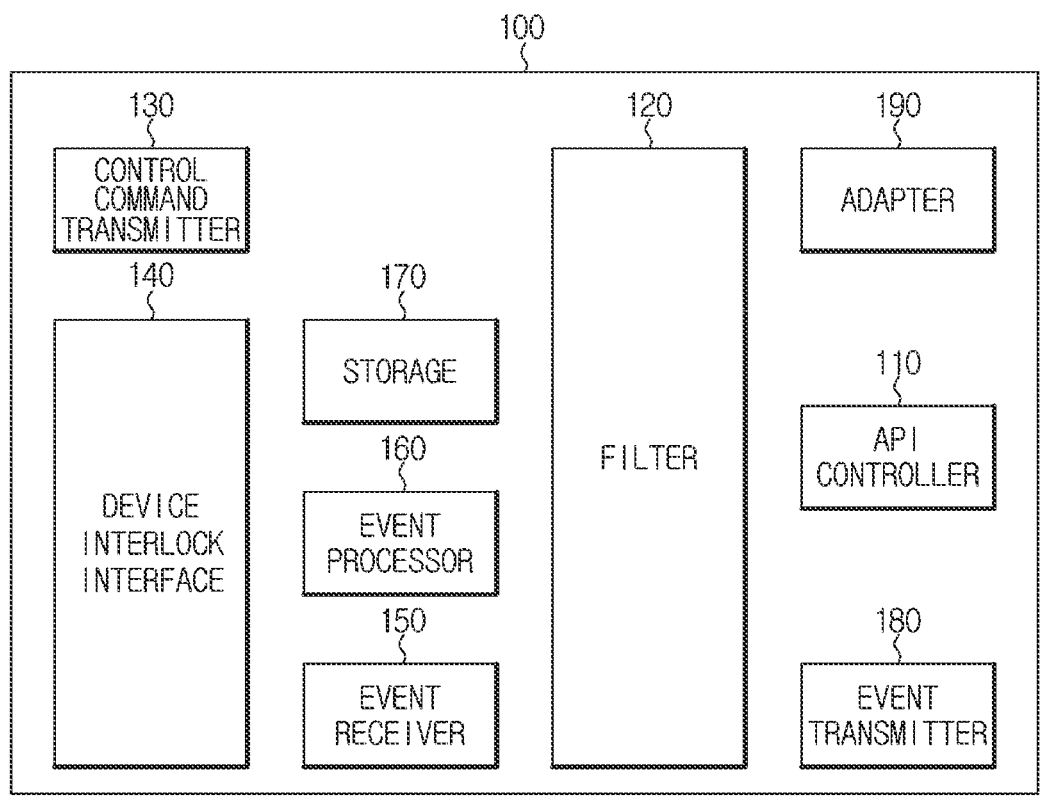

FIG. 4

```
x-csp-channel-key: appkey      ← channel key
x-csp-userId: userid           ← user id
x-csp-appId:56i4o8ae0a         ← app id
Authorization:Bearer ckwedOHl4B ← access token
```

SMART HOME SERVICE SERVER AND CONTROL METHOD THEREFOR

TECHNICAL FIELD

Embodiments of the present disclosure relate to a smart home service server and a control method for the same to implement an Internet of network between a user terminal and a plurality of devices.

BACKGROUND ART

Internet was basically developed for the mutual communication between computers operated by people trough transmission control protocol (TCP)/Internet protocol (IP), but the research has been progressed to allow all things capable of identifying, calculating and performing the communication, to perform the communication via Internet. A technology to enable all things to communicate is referred to as Internet of Things (hereinafter referred to as "IoT").

IoT is a more advanced stage than Internet or mobile Internet based on the conventional wired communication. IoT has a similar point with the conventional ubiquitous and machine to machine (M2M) in that devices connected to Internet send and receive information with each other and process the information without human intervention, and things send and receive the communication without the dependence on humans, but IoT represents information communication infrastructure configured to extend the concept of M2M to the Internet to enable all things existing in the world to communicate with each other at anywhere and anytime, by connecting all things to a network.

IoT devices may form an IoT network by being connected to a server configured to supply an IoT service. In addition, a user terminal, e.g., a mobile phone capable of receiving a control command may be connected to the server and thus a user is able to easily control the IoT device regardless of time and place.

DISCLOSURE

Technical Problem

Therefore, it is an aspect of the present disclosure to provide a smart home service and a control method for the same, capable of providing an environment in which calling a control command for a device is available via a user terminal protocol to control between the device and a user terminal based on different type of protocol.

Technical Solution

In accordance with one aspect of the present invention, A smart home service server connecting at least one device operated based on a first protocol to at least one user terminal operated based on a second protocol, includes an application programming interface (API) controller configured to allow a control command for the at least one device to be called via the second protocol of the at least one user terminal; a filter configured to convert the called control command according to the first protocol; and a control command transmitter configured to transmit the control command converted according to the first protocol, to the at least one device.

The API controller may provide an application programming interface (API) configured to call the control command of the first protocol in the second protocol, to the at least one user terminal.

The API controller may receive a call command calling the control command via the API, wherein the call command comprises authentication information about the second protocol comprising a channel key, user authentication information comprising a user ID, an application ID and an access token, and device (D) information comprising a device ID.

The API controller may allow the control command to be called by an authenticated user terminal in the at least one user terminal.

When receiving the call command via the API, the API controller may determine whether to authenticate the user terminal based on at least one of authentication information about the second protocol and user authentication information in the received call command.

When the API controller receives the call command via the API, the control command transmitter may determine a device, which is to receive the control command converted according to the first protocol, based on the device information in the received call command.

The smart home service server may further includes a device interlock interface connected to the at least one device; an event receiver configured to receive state information of the connected at least one device via the device interlock interface; an event processor configured to process the received state information; and a storage configured to store the processed state information.

When a state of at least one device among the at least one device connected via the device interlock interface is changed, the event receiver may receive state information of the at least one device in which the state thereof is changed.

The smart home service server may further include an event transmitter configured to transmit the processed state information stored in the storage, to the at least one user terminal, when the API controller receives the call command of a state information query command for the at least one device via the API.

The filter may filter the processed state information based on at least one of authentication information about the second protocol and user authentication information in the received call command, and transmits the filtered state information to the event transmitter.

When the API controller receives the call command of a state information subscription request command for the at least one device via the API, the storage may store authentication information about the second protocol, user authentication information and device information in the received call command, as subscription request information.

When the state information of the device corresponding to the device information stored as the subscription request information is changed, the event processor may process the changed state information and provide the processed state information to the event transmitter so as to transmit the changed state information to a user terminal corresponding to the authentication information about the second protocol and the user authentication information stored as the subscription request information.

When the API controller receives the call command of a state information subscription release command for the at least one device via the API, the event processor may not provide the device state information corresponding to the device information stored as the subscription request information, to the event transmitter.

When the API controller receives the call command of a condition setting command for the at least one device via the API, the storage may store condition setting information comprising conditions of the call command for the received condition setting command and the device information.

When the device state information, which corresponds to the device information stored as the condition setting information, meets conditions stored as the condition setting information, the event processor may provide a result of meeting the conditions, to the event transmitter.

The smart home service server may further include an adapter configured to allow the state information processed by the event processor, to be called by the partner server operated based on a third protocol.

The adapter may call a control command for at least one partner device via the first protocol so as to control the at least one partner server connected to the partner server based on the third protocol.

In accordance with another aspect of the present invention, a control method for a smart home service server connecting at least one device operated based on a first protocol to at least one user terminal operated based on a second protocol, includes calling a control command for the at least one device via the second protocol of the at least one user terminal, by an application programming interface (API) controller of the smart home service server; converting the called control command according to the first protocol by a filter of the smart home service server; and transmitting the control command converted according to the first protocol, to the at least one device, by a control command transmitter of the smart home service server.

The calling of the control command may include providing an application programming interface (API) configured to call the control command of the first protocol in the second protocol, to the at least one user terminal.

The calling of the control command may further include receiving a call command calling the control command via the API, from the at least one user terminal, wherein the call command comprises authentication information about the second protocol comprising a channel key, user authentication information comprising a user ID, an application ID and an access token, and device (D) information comprising a device ID.

The calling of the control command may be allowing the control command to be called by an authenticated user terminal in the at least one user terminal.

The calling of the control command may further include determining whether to authenticate the user terminal based on at least one of authentication information about the second protocol and user authentication information in the received call command, when receiving the call command.

The transmitting of the control command may further include determining a device to receive the control command converted according to the first protocol, based on the device information in the received call command, when receiving the call command.

The control method may further include being connected to the at least one device, in a device interlock interface of the smart home service server; receiving state information of the connected at least one device via the device interlock interface, in an event receiver of the smart home service server; processing the received state information, in an event processor of the smart home service server; and storing the processed state information in a storage of the smart home service server.

The receiving the state information receives state information of the at least one device in which the state thereof is changed, when a state of at least one device among the connected at least one device is changed.

The control method may further include transmitting the stored state information to the at least one user terminal, in an event transmitter of the smart home service server, when receiving the call command of a state information query command for the at least one device.

The transmitting of the stored state information to the at least one user terminal may filter the processed state information based on at least one of authentication information about the second protocol and user authentication information in the received call command, and transmits the filtered state information to the at least one user terminal.

The control method may further include storing authentication information about the second protocol, user authentication information and device information in the received call command, as subscription request information, when receiving the call command of a state information subscription request command for the at least one device.

The control method may further include transmitting the changed state information to a user terminal corresponding to the authentication information about the second protocol and the user authentication information stored as the subscription request information, when the state information of the device corresponding to the device information stored as the subscription request information is changed.

The control method may further include not providing the device state information corresponding to the device information stored as the subscription request information to the event transmitter, when the API controller receives the call command of a state information subscription release command for the at least one device via the API.

The control method may further include storing condition setting information comprising conditions of the call command for the received condition setting command and the device information, when receiving the call command of a condition setting command for the at least one device.

The control method may further include when the device state information, which corresponds to the device information stored as the condition setting information, meets conditions stored as the condition setting information, providing a result of meeting the conditions, to the at least one device.

The control method may further include allowing the processed state information to be called by the partner server operated based on a third protocol, in an adapter of the smart home service server.

The control method may further include calling a control command for at least one partner device via the first protocol so as to control the at least one partner server connected to the partner server based on the third protocol.

Advantageous Effects

In accordance with one aspect of the present disclosure, it may be possible to improve the versatility and scalability of Internet of Things (IoT) by providing a network environment capable of performing a control between a device and a user terminal based on different type protocols.

It may be possible to build a mashup service environment capable of providing various types of services by managing a plurality of information obtained from a device.

DESCRIPTION OF DRAWINGS

These and/or other aspects of the present disclosure will become apparent and more readily appreciated from the following description of the embodiments, taken in conjunction with the accompanying drawings of which:

FIG. 2 is a block diagram illustrating a smart home service server in accordance with an embodiment of the present disclosure.

FIG. 4 is a view illustrating an example of authentication information transmitted to the smart home service server via the user terminal by the authenticated user in accordance with an embodiment of the present disclosure.

BEST MODE

Figure 1A:
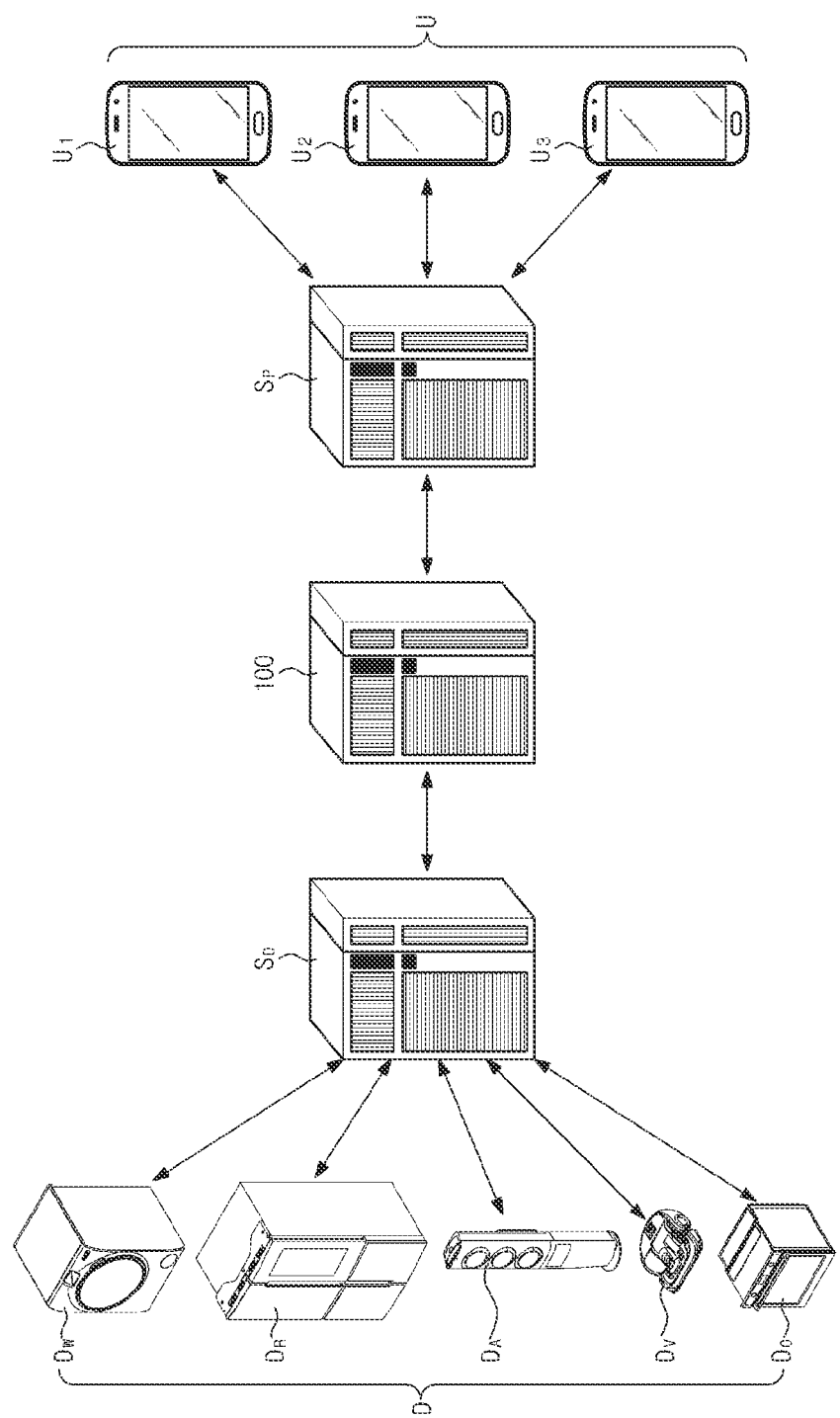
FIGS. 1A and 1B are views illustrating a network system of an IoT device in accordance with various embodiments of the present disclosure.

Embodiments described in the present disclosure and configurations shown in the drawings are merely examples of the embodiments of the present disclosure, and may be modified in various different ways at the time of filing of the present application to replace the embodiments and drawings of the present disclosure.

In addition, the same reference numerals or signs shown in the drawings of the present disclosure indicate elements or components performing substantially the same function.

Also, the terms used herein are used to describe the embodiments and are not intended to limit and/or restrict the present disclosure. The singular forms "a," "an" and "the" are intended to include the plural forms as well, unless the context clearly indicates otherwise. In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

The present disclosure will be described more fully hereinafter with reference to the accompanying drawings.

Figure 1B:
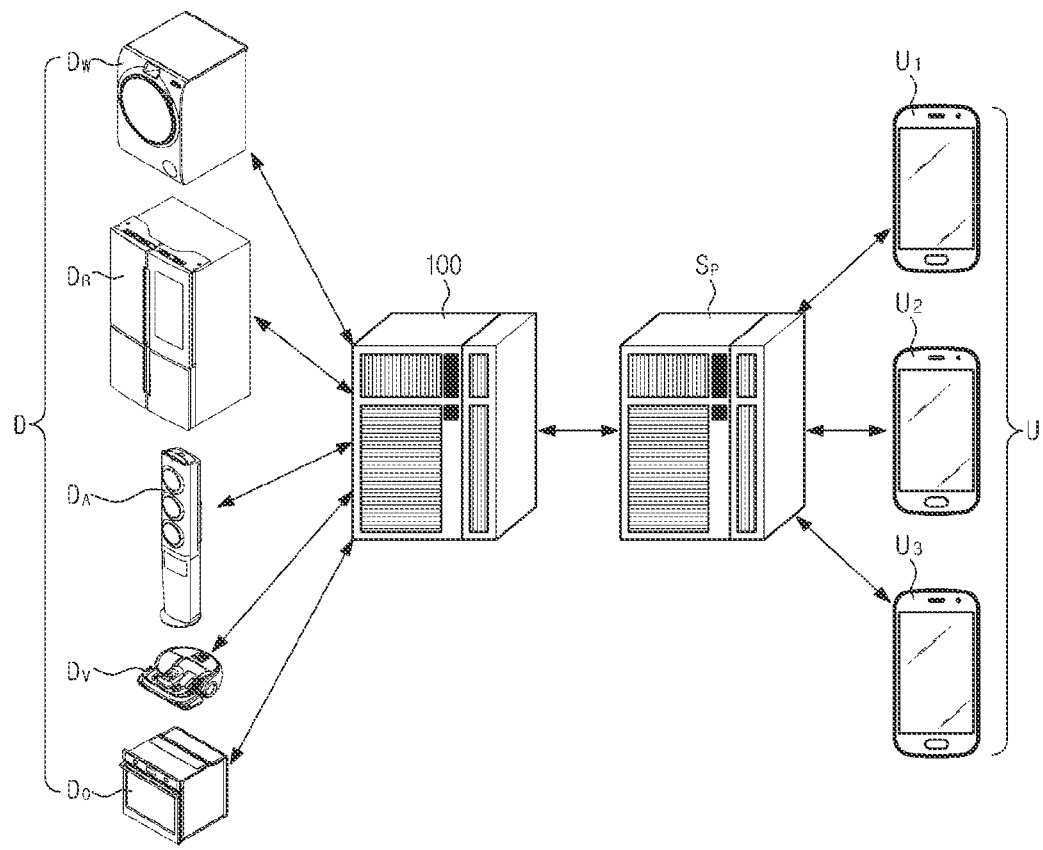

FIGS. 1A and 1B are views illustrating a network system of an IoT device in accordance with various embodiments of the present disclosure.

Internet of Things (IOT) represents intelligent technologies and services to allow information to be communicated between people and things or between things and things by connecting all things with each other based on Internet. Techniques for implementing IoT include a sensing technique to obtain information from concrete things and surrounding environments, a wired/wireless communication and network infrastructure technique to support to allow things to be connected to Internet, a service interface technique to process information in accordance with various service fields and types and to fuse a variety of techniques, and a security technique to prevent hacking and information leakage about components of the IoT, e.g., a large amount of data.

Devices (D) capable of being connected to a network based on IoT may include all things in the surroundings, e.g., a variety of home appliances, e.g., a washing machines Dw, a refrigerators DR, an air conditioner DA, a cleaner Dv, and an oven Do, a digital camera, a computer, a laptop, a sensor, a car audio, a digital meter, a door lock, a game console, a speaker and a security device. However, the devices (D) are not limited thereto.

The device (D) may form an IoT network by being connected to a device server (SD). The device server (SD) may provide an IoT service by receiving information from the connected device (D), storing the information and transmitting the information to other device (D).

The above mentioned configured IoT network is required to operate according to the same protocol. "Protocol" may represent rules about various communication standards and methods, i.e., a communication convention, to allow information to be smoothly communicated between the device server (SD) and at least one device connected to the device server (SD), wherein the communication convention may represent defining a transmission method, a communication method of mutual connection and information, a sent and received information type, an error detection method, a code conversion method, and a transmission speed.

Operation based on the same protocol may represent that information is exchanged according to the same method. Accordingly, since a device server and a device forming the same IoT network send and receive a control command in the same form, mutual control may be allowed. It may be possible for a user to directly control the device by connecting to the above mentioned configured IoT network. Particularly, a user may connect a user terminal to the device server of the IoT network and input a control command via the user terminal, thereby controlling a device connected to the IoT network. The user terminal (U) may be connected to the device server (SD) via a variety of communication links, e.g., a ZigBee network, a Wi-Fi network, a Bluetooth communication network, a mobile communication network, a local area network (LAN), a wide area network (WAN), or a point-to-point communication.

In addition, the user terminal (U) may include a smart phone, a cellular phone, a tablet PC, a smart TV, a digital camera, a personal digital assistant (PDA), a remote controller, a portable multimedia player (PMP), a note book, and a desk top computer.

A user terminal connected to the IoT network is required to operate according to the same protocol as a device and device server in the same network. When a control command for the user terminal is input via the user terminal, the protocol of the user terminal may be required to follow the protocol of the device and the device server so that the input command is directly applied to the device forming the IoT network.

Particularly, an application according to the protocol that is the base of the operation of the device and the device server may be installed in the user terminal to receive an input of the control command based on the same protocol as the device and the device server forming the IoT network. The application installed in the user terminal may provide an environment in which accessing to the IoT network, providing information about the IoT network conditions, setting about the IoT network, providing information about each of the device (D) forming the IoT network and/or control of each of the device (D) forming the IoT network are available.

As described above, the application installed in the user terminal may be implemented according to a specific protocol, and a user can input a control command for a device using the same protocol as the installed application. As a result, it may be required that the user installs every application corresponding to the protocol adapted by each device to control different devices based on different type protocols.

To overcome this problem, according to the embodiment, a smart home service server 100 may be capable of providing an Application Programming Interface (hereinafter referred to as "API") configured to function as an interface between different protocols, so as to improve the generality of the device (D) forming the IoT network.

Referring to again FIG. 1A, according to the embodiment of the present disclosure, as for the network system, a server to which a plurality of devices (D) is connected and a server to which a plurality of user terminals U1, U2 and U3 may be different from each other. Particularly, the plurality of devices (D) may be connected to the device server (SD) and the plurality of user terminals U1, U2 and U3 may be connected to a partner server (SU). In this time, since the plurality of devices (D) is operated according to a first protocol, the plurality of devices (D) together with the device server (SD) may build a single IoT network and since the plurality of user terminals U1, U2 and U3 is operated according to a second protocol, the plurality of user terminals U1, U2 and U3 together with the partner server may built another IoT network.

As mentioned above, when different IoT networks based on different protocols are directly connected to each other, the type of information and transmission method including a control command may be different from each other, and thus the communication therebetween may be impossible.

According to the embodiment, the smart home service server 100 may be connected to both of the device server (SD) to which the device (D) is connected, and the partner server (SU) to which the user terminal (U) is connected. In addition, the smart home service server 100 may provide the API configured to call the control command of the first protocol on the second protocol, to the plurality of user terminals U1, U2 and U3 so that the control between the plurality of user terminals U1, U2 and U3 and the device (D) based on different protocols is performed.

The API may be defined as a set of subroutines or functions that can be called for a certain process of other protocol from any one protocol. As a result, the API may provide an environment in which an operation of other protocol is performed in any one protocol.

FIG. 1A illustrated that the smart home service server 100 is connected to both of the device server (SD) to which the device (D) is connected, and the partner server (SU) to which the user terminal (U) is connected. Alternatively, the smart home service server 100 may be directly connected to the plurality of devices (D), as illustrated in FIG. 1B.

Hereinafter, according to an embodiment of the present disclosure, a description of the configuration and operation of smart home service server 100 will be described in details. It is assumed that the plurality of devices (D) connected to the smart home service server 100 is controlled by the control command of the first protocol and the user terminal (U) connected to the smart home service server 100 is controlled by the control command of the second protocol. Particularly, it is assumed that an application configured to receive an input of the control command of the second protocol is installed in the user terminal (U).

Figure 3:
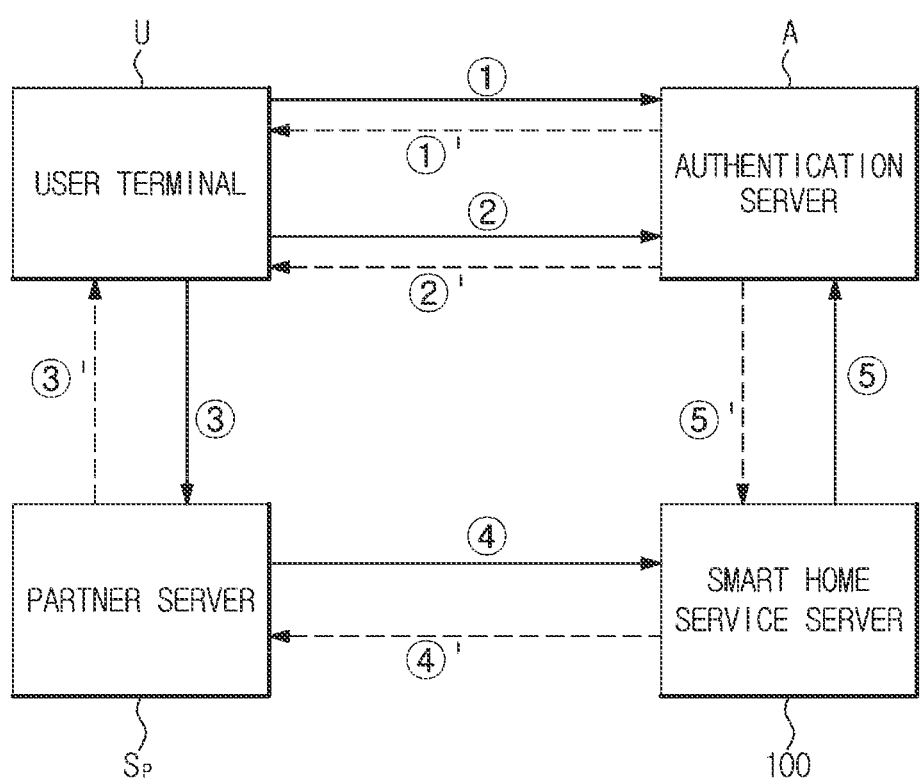
FIG. 3 is a view illustrating an authentication process for a user in accordance with an embodiment of the present disclosure.

FIG. 2 is a block diagram illustrating a smart home service server in accordance with an embodiment of the present disclosure and FIG. 3 is a view illustrating a communication method of the smart home service server in accordance with an embodiment of the present disclosure.

Referring to FIG. 2, the smart home service server 100 may include an API controller 110 configured to provide an API to call the control commands of the first protocol via the second protocol; a filter 120 configured to convert the called control command according to the first protocol; a control command transmitter 130 configured to transmit the converted control command to the outside; a device interlock interface 140 connected to an external device (D); an event receiver 150 configured to receive state information of the device (D) via the device interlock interface 140; an event processor 160 configured to process the received state information; a storage 170 configured to store a variety of information including the processed state information; an event transmitter 180 configured to transmit the processed state information to the outside; and an adapter 190 configured to allow the processed state information to be called by the partner server (SP) operated based on a third protocol.

The storage 170 may store a variety of information to connect networks based on different protocols. The storage 170 may store information related to at least one device (D) connected to the smart home service server 100 via the device interlock interface 140, information of user of the device (D), mapping information thereof, and condition information of the device (D). The following tables 1, 2, 3, and 4 will illustrate information of device (D) connected to the home service server, user information, mapping information and condition information.

TABLE 1

| Data | Explanation | Etc. |
|---|---|---|
| Device ID | ID | |
| UUID | Unique ID of device | |
| Device Type | Device Type | |
| Model ID | Model name | |
| Manufacturer | Manufacturer name | |

TABLE 2

| Data | Explanation | Etc. |
|---|---|---|
| User ID | ID | |
| User Name | User Name | |
| Account ID | ID used for identification | |
| Country Code | User country information | |

TABLE 3

| Data | Explanation | Etc. |
|---|---|---|
| User ID | ID | User ID of user information |
| Device ID | User Name | Device ID of device information |
| Device Name | Device name set by user | |
| Description | Detail description of device set by user | |

TABLE 4

| Data | Explanation | Etc. |
|---|---|---|
| User ID | ID | User ID of user information |
| Device ID | User Name | Device ID of device information |
| Resource | Resource name (e.g., Power and Temperature) | Power==off Resource: power |
| Operator | ==, <, >, eq, ne, etc. | Operator:== |
| Condition Value | Condition value | Condition: off |

Referring to table 1, the device (D) Information stored in the storage 170 may include 'Device ID' which is to identify the device (D), 'UIDD', which is an unique ID, 'Device Type' indicating the type of the device (D), 'Model ID' indicating a model name, and 'Manufacturer' indicating a manufacturer information.

Referring to table 2, the user information stored in the storage 170 may include 'User ID' which is an ID to identify a user of the device (D), 'UnerName' which is a user name, 'AccountID' which is an ID used at the authentication, and 'CountryCode' indicating user's country information.

In addition, the mapping information configured to perform mapping the device (D) and a user using the device (D) may be stored in the storage 170. Referring to table 3, the mapping information stored in the storage 170 may include a result of mapping the above mentioned UserID and DeviceID, and may further include 'DeviceName' set by the user, and 'Description' representing detailed information of the device (D) set by the user.

The storage 170 may further include the condition information for the operation of the device (D). Referring to table 4, the condition information stored in the storage 170 may include 'Resource' which is a name of the resource, which is a subject for the condition setting, 'Operator' which is operator information for the condition setting, and 'Condition Value' which is a condition value for the condition setting, as well as the above mentioned 'UserID' and 'DeviceID'.

The storage 170 may include authentication information about the second protocol which is authenticated to be connected to the smart home service server 100, i.e., authentication information about the partner server (SP). Table 5 illustrates an example of authentication information about the partner server (SP).

TABLE 5

| Data | Explanation | Example. |
|---|---|---|
| Partner ID | Partner ID | |
| Partner Name | Partner Name | |
| Notification URL | Partner URL to transmit Notification | 'http://1.2.3.4:8080/ssh/callback' |
| PartnerAccount ID | Partner Account ID | @.com |
| ChannelKey | Key(assigned by company) to authenticate partner | 'wd2bOdfdfeeaaIPhVJI5mL1gaI7tr PsC8M6gex9AA=' |
| AppID | App ID to authenticate partner | '1sred55kkk4' |
| Appsecuritykey | App key to authenticate partner | APPSECURITYKEY |
| AuthHeader | Information to authenticate server in partner | ("Authorization":"Basic deK989BKarb34") |

Referring to table 5, the authentication information of the partner server (SP) stored in the storage 170 may include TartnerID' which is to identify the partner server (SP), 'PartnerName' indicating a partner name, NotificationURL' which is a URL to notify the device (D) information to the partner server (SP), TartnerAccountID' used to authenticate the partner server (SP), 'ChannelKey' which is a key assigned by the smart home service server 100 to authenticate the partner server (SP), 'AppID' which is an application ID for authenticating the partner server (SP), and 'AppSecurityKey' which is an application key for authenticating the partner server (SP), and "AuthHeader" assigned by the partner server (SP) to authenticate the smart home service server 100.

In addition, the storage 170 may further store authentication information of individual user connected to the partner server (SP). For this, the user of the user terminal (U) connected to the partner server (SP) may go through an additional authentication and a detailed description thereof will be described with reference to FIG. 3.

FIG. 3 is a view illustrating an authentication process for a user in accordance with an embodiment of the present disclosure, and FIG. 4 is a view illustrating an example of authentication information transmitted to the smart home service server via the user terminal by the authenticated user in accordance with an embodiment of the present disclosure.

First, in a step ①, a user who wants to be authenticated, may request an authentication to an authentication server. Particularly, the user may transmit an AppID which is an application ID of the partner server (SP) to which the user terminal (U) is connected, to the authentication server. In response to this request, in a step ①', when the user terminal (U) of the user who requests the authentication, is confirmed to be connected to the authenticated partner server (SP), the authentication server may transmit an Auth-code, which is an authentication code, to the user terminal (U).

In a step ②, the user terminal (U) receiving the Auth-code may request an access token to the authentication server, and in a step ②', the authentication server may assign an unique access token indicating that the corresponding user is authenticated, to the user terminal (U).

Therefore, the user may complete the authentication process by the authentication server. That is, the authentication of the user terminal (U) may be determined by the authentication of the partner server (SP) and the authentication of the user.

When the authentication process is completed, in steps ③ and ③', when the user terminal (U) transmits information including the control command to the partner server (SP), the user terminal (U) may transmit the authentication information including the assigned access token.

Referring to FIG. 4, the authentication information transmitted to the user terminal (U) may indicate that the access token is transmitted as well as the above mentioned ChannelKey, UserID, and AppID.

In steps ④ and ④,' the partner server (SP) receiving the authentication information may transmit the authentication information received from the user terminal (U), to the smart home service server 100. In steps ⑤ and ⑤, the smart home service server 100 receiving the authentication information may determine whether the access token is valid by transmitting the authentication information to the authentication server. When it is determined that the access token is valid, the smart home service server 100 may store the valid access token as the authentication information of the user terminal (U).

As a result, when information, which is received from a certain user terminal (U), has a pre-stored valid access token, the smart home service server 100 may determine that the corresponding user terminal (U) is authenticated without confirming whether to authenticate the corresponding user terminal (U) through the authentication server, and then proceed with the process.

In addition, the storage 170 may store a controllable device (D) list, and state information of the controllable device (D), and a description thereof will be described.

The storage 170 may be implemented by any one of a flash memory type, a hard disk type, a multimedia card micro type, a card type memory (e.g., SD or XD memory Etc.), a random access memory (RAM), a static random access memory (SRAM), a read only memory, (ROM), an electrically erasable programmable read only memory (EEPROM), a programmable read only memory (PROM), a magnetic memory, a magnetic disk, and an optical disk.

Figure 5:
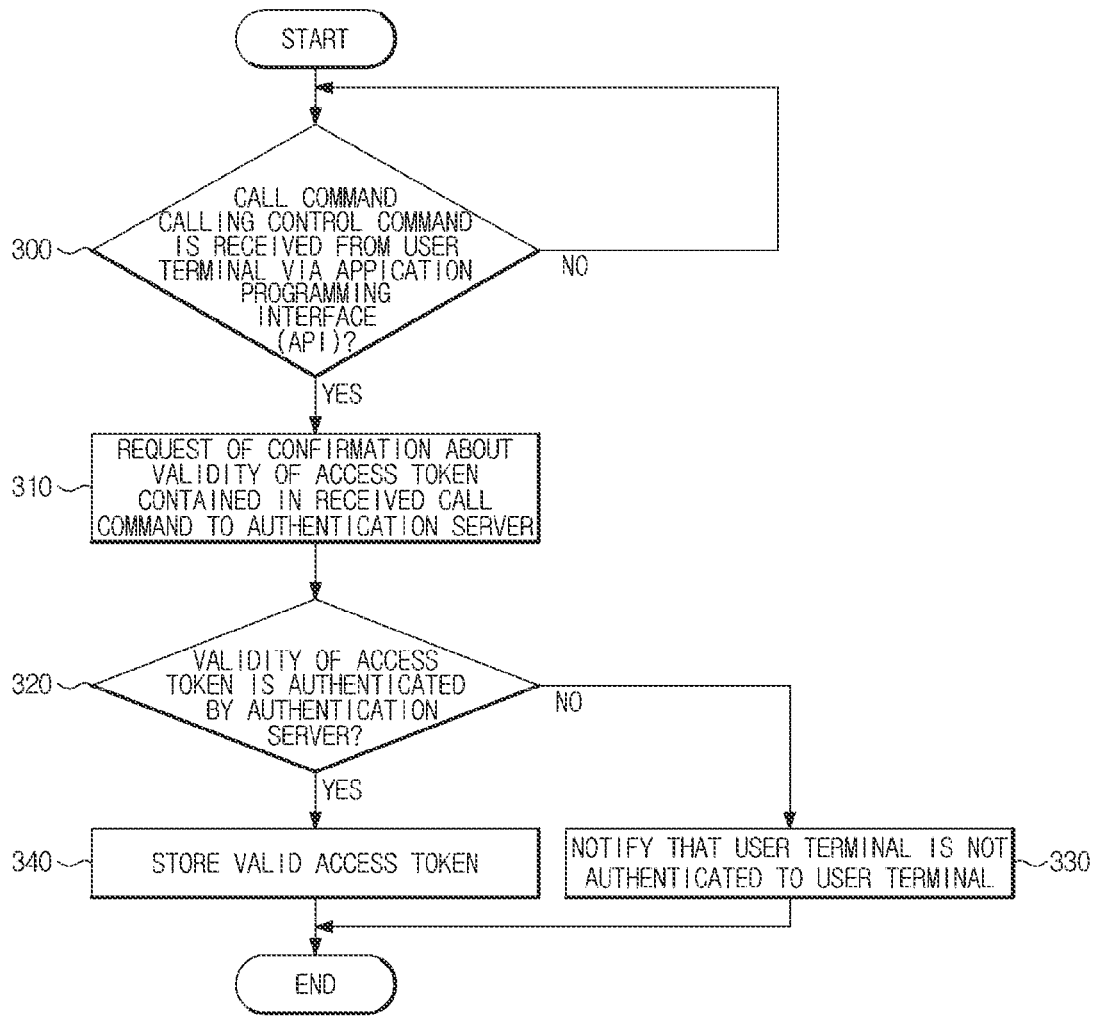
FIG. 5 is a flowchart illustrating a method of confirming whether to authenticate the user terminal by the smart home server in accordance with an embodiment of the present disclosure.

FIG. 5 is a flowchart illustrating a method of confirming whether to authenticate the user terminal by the smart home server in accordance with an embodiment of the present disclosure.

First, the smart home service server 100 may check whether a call command calling a control command via the API is received from the user terminal (U) (300). When the call command is not received, the smart home service server 100 may repeatedly check whether the call command is received.

When the call command is received, the smart home service server 100 may request the confirmation about the validity of the access token contained in the received call command, to the authentication server (310). The access token may be assigned to a user terminal (U), which receives the Auth-code, as the user terminal (U) connected to the authenticated partner server (SP), by the authentication server.

The smart home service server 100 may check whether the authentication server authenticates the validity of the access token, by receiving a result of the request (320).

When the access token is not valid, the smart home service server 100 may notify that the user terminal (U) is not authenticated, to the user terminal (U) (330).

In contrast, when the access token is valid, the smart home service server 100 may store the valid access token in the storage 170 (340). The stored access token may be used to determine whether an access token contained in a call command, which is received later, is valid or not.

Referring to again FIG. 2, the API controller 110 may provide an environment allowing calling the control command of the device (D) in the authenticated user terminal (U) based on a protocol different from a protocol of the device (D). Hereinafter a transmission path of the control command called by the API controller 110 will be described with reference to FIG. 6.

Figure 6:
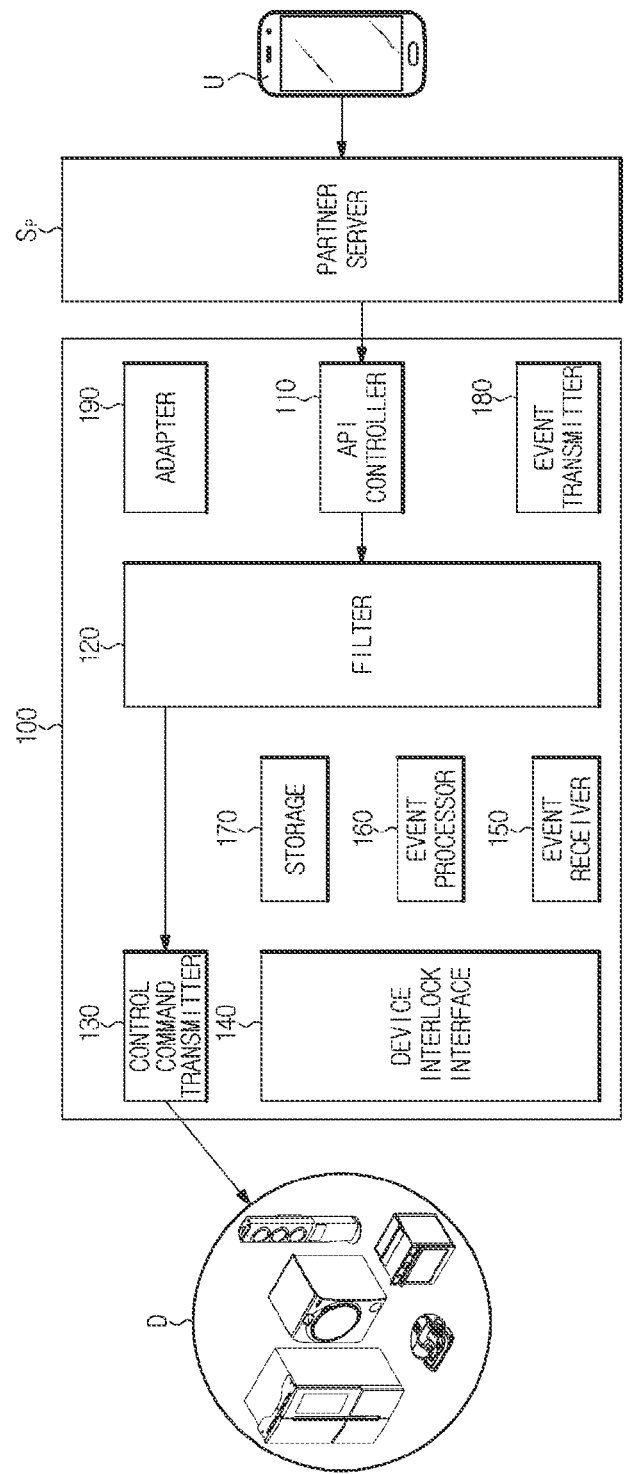
FIG. 6 is a view illustrating an information transmission path when a device control command is called via the API in the API controller in accordance with an embodiment of the present disclosure.

FIG. 6 is a view illustrating an information transmission path when a device control command is called via the API in the API controller in accordance with an embodiment of the present disclosure.

As described above, the API controller 110 may store an API calling a control command of the first protocol in the second protocol, and provide the API to the user terminal (U). As a result, it may be possible to call the control command according to the first protocol of the device (D) via the second protocol of the user protocol.

In this time, the API controller 110 may receive a call command calling the control command according to the first protocol in the second protocol of the user protocol. The call command may include the authentication information about the second protocol including the channel key, the user authentication information including the user ID, the application ID and the access token, and the device (D) information including the device ID, as well as a control command to be called.

When the call command is received, the filter 120 may convert the called control command into the type of the first protocol. For example, the control command contained in the call command received by the API controller 110 may be {"Wind": {"speedLevel":} 0}. "{"Wind": {"speedLevel":} 0}" may represent a control command for a wind strength of a certain device (D). In response to the control command, the filter 120 may convert the above mentioned control command into the type of the first protocol, i.e., the type of the control command to allow the control of the device (D), e.g., {"Device": {"Wind": {"speedLevel":0, "Mode": {"options":["Comode_Off"]} }.

The control command transmitter 130 may transmit the control command converted according to the first protocol, to the device (D). In this time, the control command transmitter 130 may determine a device (D), which is to receive the control command converted according to the first protocol, based on the device (D) information contained in the above mentioned call command. As mentioned above, since the device (D) information includes 'DeviceID', the control command transmitter 130 may transmit the control command, which is converted by the filter 120, to a device (D) having 'DeviceID' contained in the call command.

As a result, it may be possible to transmit the control command, which is input through the user terminal (U) based on the second protocol, to the device (D) based on the first protocol. The device (D) receiving the control command may be controlled according to the control command.

In addition, the smart home service server 100 may transmit state information, which is changed due to the result of controlling the device (D) controlled according to the received control command, to the user terminal (U). A description thereof will be described with reference to FIGS. 7, 8, 9A and 9B, in details.

Figure 7:
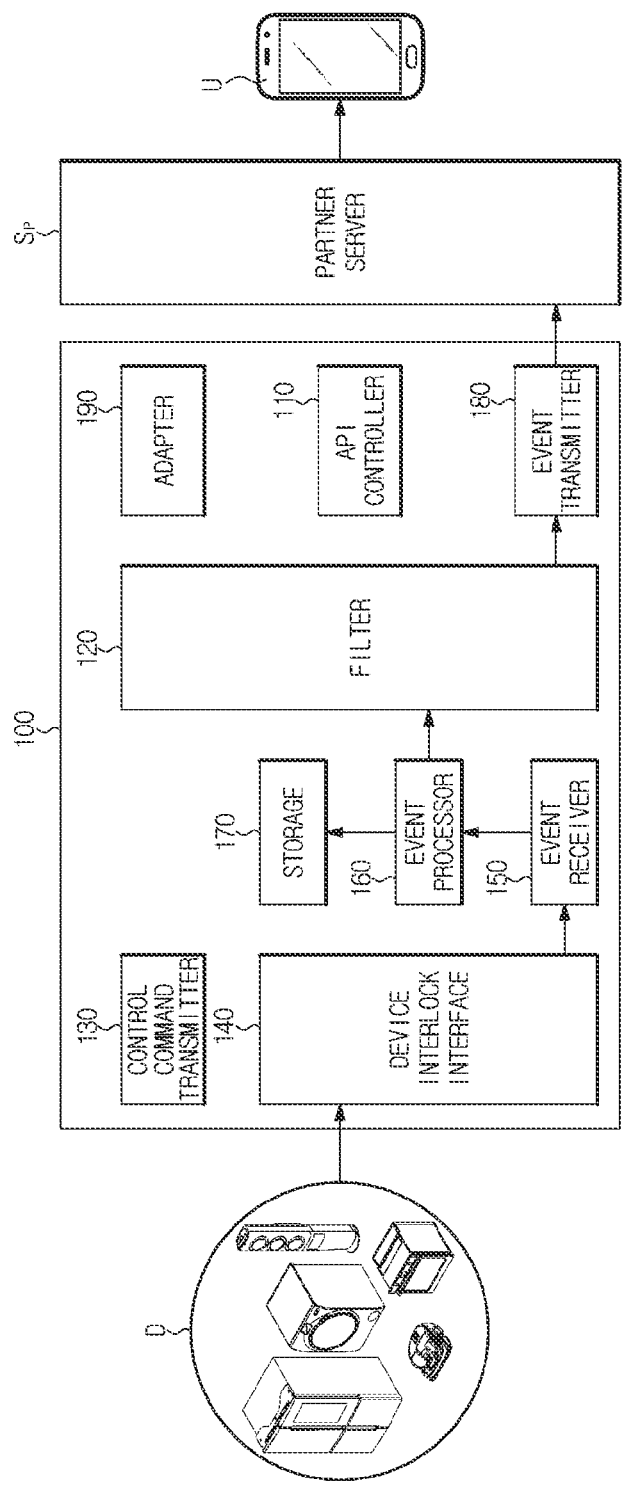
FIG. 7 is a view illustrating a transmission path of device state information changed according to a control command transmitted via the transmission path of FIG. 6.
Figure 8:
FIG. 8 is a view illustrating an example of device state information stored in the storage in accordance with an embodiment of the present disclosure.
Figure 9A:
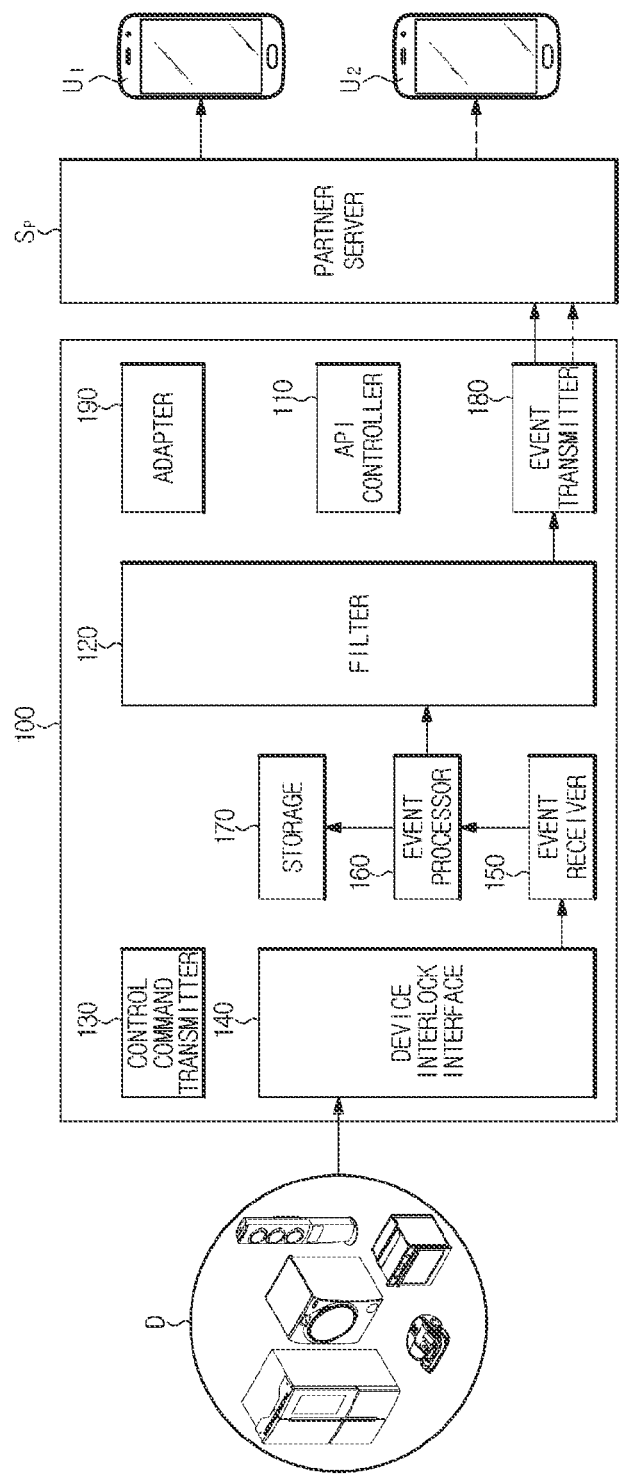
FIGS. 9A and 9B are views illustrating a method of filtering state information by a filter in accordance with an embodiment of the present disclosure.
Figure 9B:
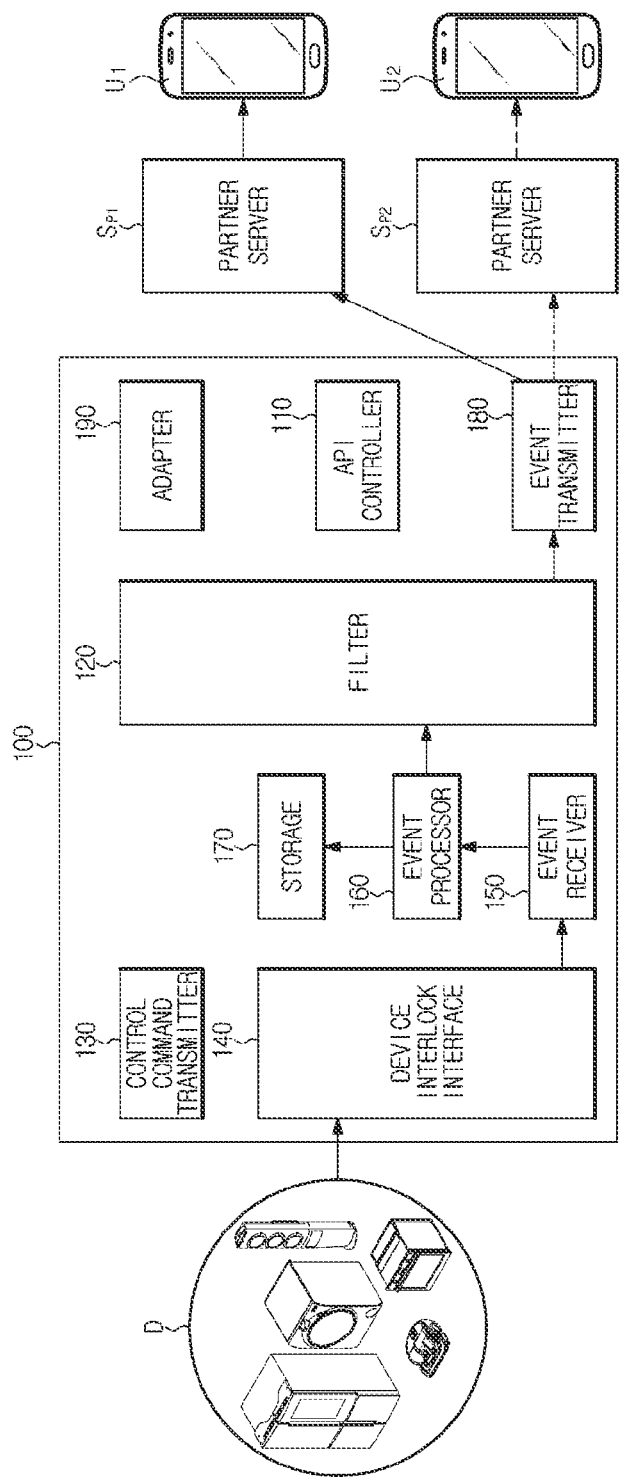

FIG. 7 is a view illustrating a transmission path of device state information changed according to a control command transmitted via the transmission path of FIG. 6, FIG. 8 is a view illustrating an example of device state information stored in the storage in accordance with an embodiment of the present disclosure, and FIGS. 9A and 9B are views illustrating a method of filtering state information by a filter in accordance with an embodiment of the present disclosure.

The device (D) receiving the control command via the above mentioned transmission path of FIG. 6 may be controlled by the control command. As a result, the state of the corresponding device (D) may be changed. When an event occurs, wherein the event represents that the stat information of the device (D) connected to the smart home service server 100, is changed, it may be possible to transmit the event to the event receiver 150 via the device interlock interface 140.

In the event receiver 150, the received event may be temporarily stored in sequence and output in sequence, in the same manner as the queue. The event processor 160 may process the stored data to allow the store data to be valid by processing the temporarily stored event according to the flow control method. "Flow control" may represent a control configured to transmit a data frame while maintaining a transmission rate that a receiver can afford.

When the event is processed, the event processor 160 may store the processed event in the storage 170. For example, the storage 170 may store the event (S) according to the change in the state information of the certain device, together with the device (D) information.

Referring to FIG. 8, the storage 170 may store the device (D) information including that DeviceID is a "FFFFFF-FFFF-FFFF-FFFFFFFFFFFFFFFF", DeviceName is "Oven", UUID is a "FFFFFF-FFFF-FFFF-FFFFFFFFFFFFFFFF", DeviceType is "Oven" and Description is "My Oven". Further, the storage 170 may store the state information (S) including that Resources are "Temperatures", "Configuration", "Operation", "Oven" and "Alarms", and state of each resources, after storing the device (D) information.

The event processor 160 may transmit the processed event to the partner server (SP) via the event transmitter 180. Accordingly, the user may recognize that the state information of the device (D) is changed according to the control command, via the user terminal (U).

At this time, the event processor 160 may provide the processed event to the event transmitter 180 via the filter 120. The filter 120 may filter the provided event with the information of the user terminal (U), which is to receive the event, and then transmit the filtered event to the event transmitter 180. For example, when the processed event is generated according to the control command called from the user terminal (U), the filter 120 may filter events processed by the event processor 160, based on the user authentication information of the call command for calling the control command.

According to an embodiment, the filter 120 may confirm a level that is determined according to the user authentication information, and then differently filter the event according the confirmed level. Therefore, the user terminal (U) in different level may confirm a different device (D) state information change event.

For example, when the expertise level about the user information is classified according to the authentication information about the second protocol (the authentication information about the partner server (SP)) in the user authentication information and the user authentication information, the filter 120 may filter information having a low expertise among the state information change event of the device (D) by increasing a filter level, as the user information has a lower expertise level. Alternatively, when the user information access authority level about the user information is classified according to the authentication information about the second protocol (the authentication information about the partner server (SP)) in the user authentication information and the user authentication information, the filter 120 may filter information having a low classification among the state information change event of the device (D) by increasing a filter level, as the user information has a lower information access authority level.

FIG. 9A illustrates a case in which two type state information passing through different filters based on the user authentication information are transmitted to different user terminal U1 and U2 connected to the same partner server (SP). Accordingly, the user receiving the service from the same partner server (SP) may differently provide the state information of the device (D) in consideration with the specificity of each user.

In contrast, FIG. 9B illustrates a case in which two type state information passing through different filters based on the authentication information about the partner server (SP1 and SP2) are transmitted to different user terminal U1 and U2 connected to the different partner server partner server (SP1 and SP2). Accordingly, the user of different user terminal (U1 and U2) connected to the different partner server (SP1 and SP2) providing different services may differently receive different state information of the device (D) according to the service provided from the different partner server (SP1 and SP2).

Meanwhile, the control command called from the API controller 110 may include a command for controlling the operation of the smart home service server 100 related to the device (D) state information, as well as a command for controlling the operation of the device (D).

Hereinafter the transmission path of the control command and the transmission path of the device (D) state information will be described in a separate manner according to the control command type.

A case in which a device (D) state information query command is called as a control command will be described with reference to FIGS. 10 to 12.

Figure 10:
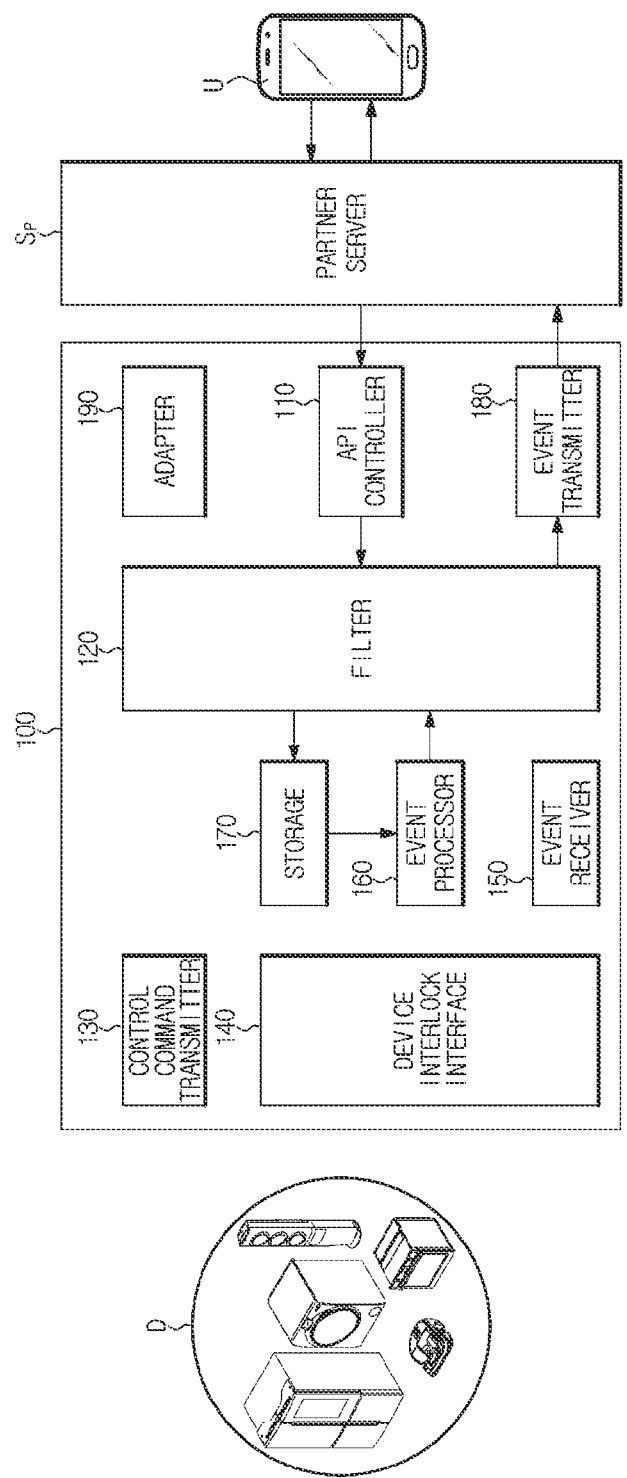
FIG. 10 is a view illustrating an information transmission path when a device state information query command is called via the API in the API controller in accordance with an embodiment.
Figure 11:
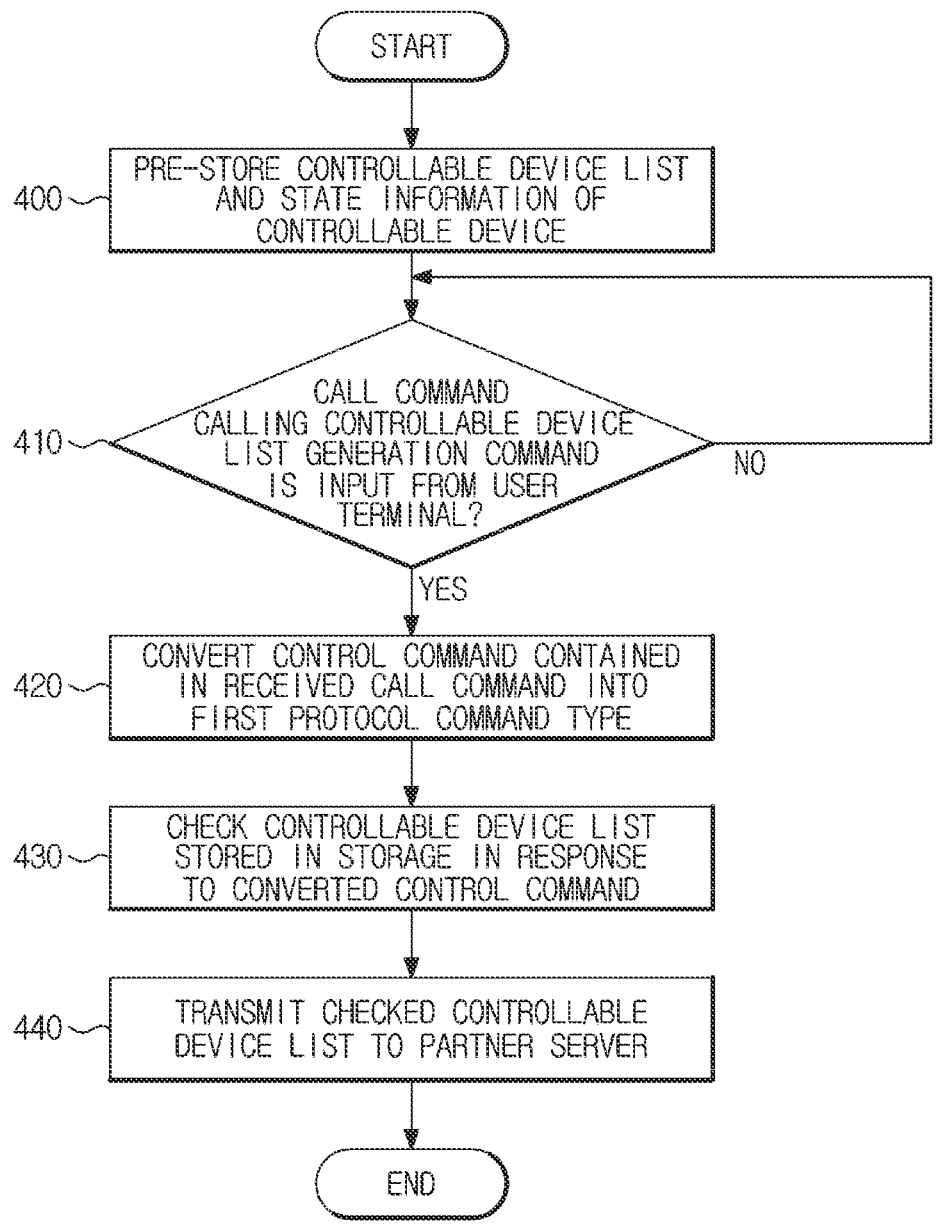
FIG. 11 is a flowchart illustrating an operation when a call command of a controllable device list generation command is received, among a control method of the smart home service server in accordance with an embodiment.
Figure 12:
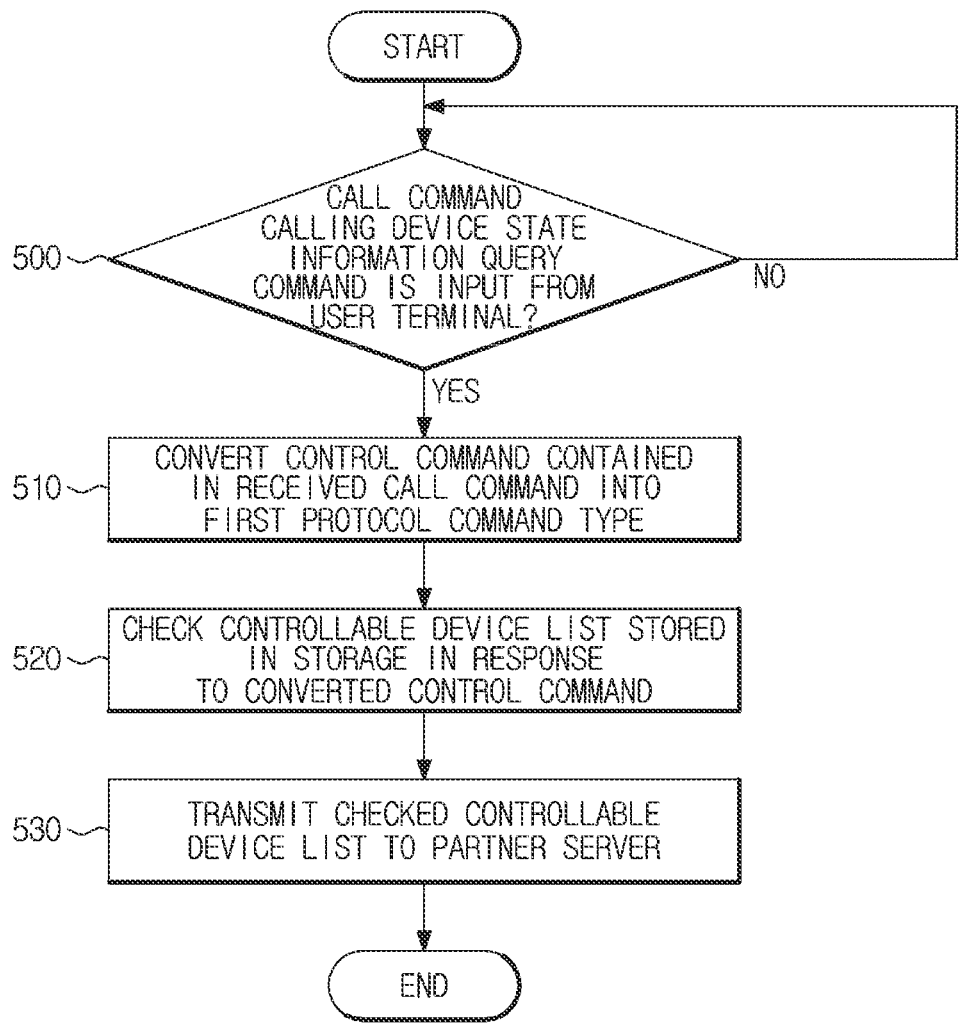
FIG. 12 is a flowchart illustrating an operation when a call command of a state information query command is received, among the control method of the smart home service server in accordance with an embodiment.

FIG. 10 is a view illustrating an information transmission path when a device state information query command is called via the API in the API controller in accordance with an embodiment, FIG. 11 is a flowchart illustrating an operation when a call command of a controllable device list generation command is received, among a control method of the smart home service server in accordance with an embodiment, and FIG. 12 is a flowchart illustrating an operation when a call command of a state information query command is received, among the control method of the smart home service server in accordance with an embodiment.

Referring to FIGS. 10 and 11, the storage 170 may store a controllable device (D) list and state information thereof in advance (400). "Controllable device (D)" may include all device (D) connected to the smart home service server 100 via the device interlock interface 140 and a device (D) which is not in a state in which a control command is not receivable, e.g., the power is turned off, or a device (D) selected by a user.

The API controller 110 may confirm whether a call command calling the controllable device list generation command is input via the partner server (SP) from the user terminal (U) (410). According to an embodiment, the call command may include "Get devices".

When the call command is not input, the API controller 110 may repeatedly confirm whether the call command is input.

In contrast, when the call command is input, the API controller 110 may transmit the control command contained in the received call command, to the filter 120, and the filter 120 may convert the received control command into a first protocol command type (420).

According to the converted control command, the storage 170 may check the stored controllable device (D) list (430), and the event processor 160 may transmit the controllable device (D) list to the event transmitter 180 via the filter 120.

At last, the event transmitter 180 may transmit the controllable device (D) list to the partner server (SP) (440), and the user terminal (U) may receive the controllable device (D) list from the partner server (SP). Accordingly, the user may visually check the device (D) list which is currently controllable.

After the user checks the controllable device (D) list, the user may inquiry at least one device state information in the list.

For this, referring to FIGS. 10 to 12, the API controller 110 may check whether a call command calling a device (D) state information query command is input from the user terminal (U) via the partner server (SP) (500). In this time, the call command may include information related to a device (D) which wants to inquiry the state information. According to an embodiment, the call command may include "Get devices (DeviceID)".

When the call command is not input, the API controller 110 may repeatedly confirm whether the call command is input.

In contrast, when the call command is input, the API controller 110 may transmit the control command contained in the received call command, to the filter 120, and the filter 120 may convert the received control command into the first protocol command type (510).

According to the converted control command, the storage 170 may check the state information of the stored device D (520), and the controller may determine which device (D)'s state information to be checked by using the device (D) information contained in the call command.

The event processor 160 may transmit the controllable device (D) list to the event transmitter 180 via the filter 120 and at last, the event transmitter 180 may transmit the device (D) state information to the partner server (SP) (530). As a result, the user terminal (U) may receive the device (D) state information from the partner server (SP). Accordingly, the user may visually check the selected device (D) state information.

A case in which a subscription request command and a subscription release command of the device (D) state information are called as a control command, will be described with reference to FIGS. 13 to 15.

Figure 13:
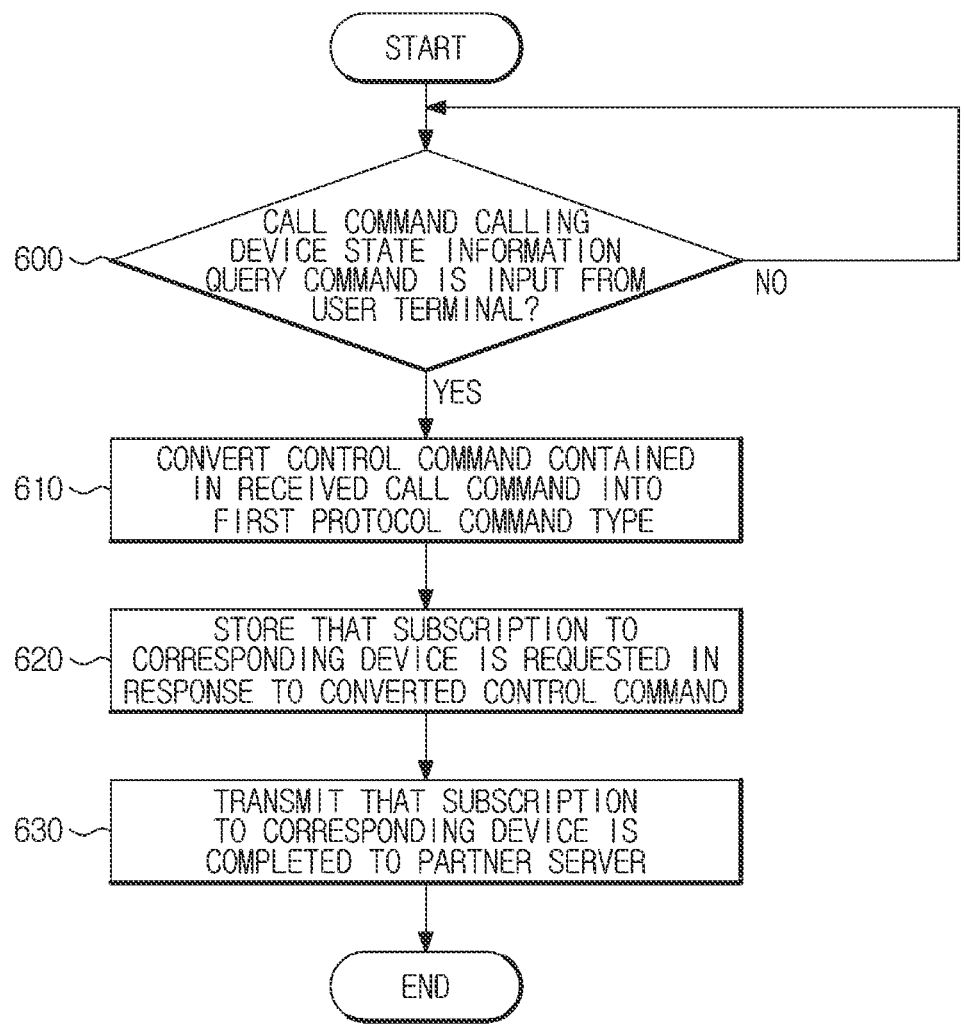
FIG. 13 is a flowchart illustrating an operation when a call command of a subscription request command of the device (D) state information is received, among the control method of the smart home service server in accordance with an embodiment.

FIG. 13 is a flowchart illustrating an operation when a call command of a subscription request command of the device (D) state information is received, among the control method of the smart home service server in accordance with an embodiment.

The API controller 110 may confirm whether a call command calling the device (D) state information subscription request command is input via the partner server (SP) from the user terminal (U) (600). In this time, the call command may include information related to a device (D) which wants to subscribe the state information. According to an embodiment, the call command may include "Post Subscriptions (DeviceID)".

When the call command is not input, the API controller 110 may repeatedly confirm whether the call command is input.

In contrast, when the call command is input, the API controller 110 may transmit the control command contained in the received call command, to the filter 120, and the filter 120 may convert the received control command into the first protocol command type (610).

According to the converted control command, the storage 170 may store that the subscription is requested to the corresponding device (D) (620). In this time, the controller may determine which device (D) to be subscribed by using the device (D) information contained in the call command.

After what the corresponding device (D) is subscribed is stored, the event processor 160 may transmit that the subscription is completed, to the event transmitter 180 via the filter 120, and at last, the event transmitter 180 may transmit that the subscription is completed, to the partner server (SP) (630). As a result, the user terminal (U) may receive the information indicating that the subscription is completed, from the partner server (SP). Accordingly, the user may visually check that the subscription is completed normally.

Figure 14:
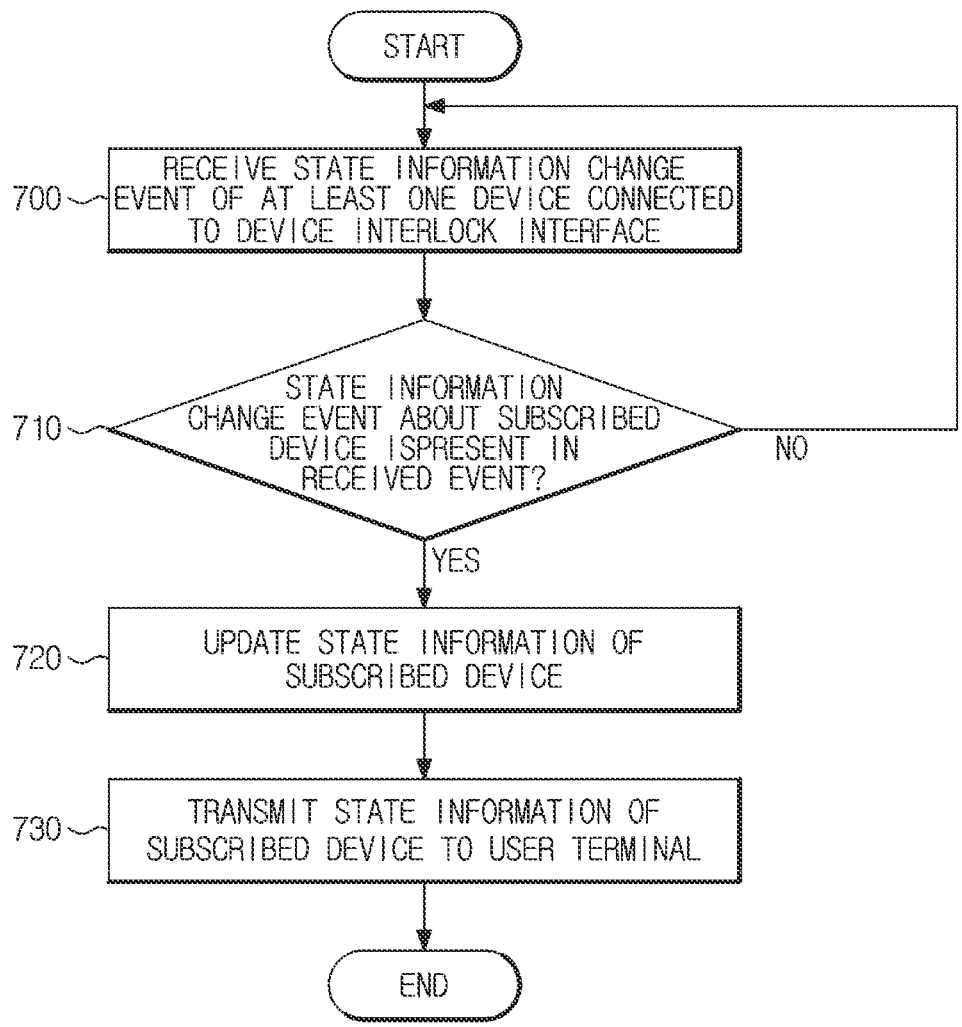
FIG. 14 is a flowchart illustrating an operation of transmitting state information after the subscription is completed, as illustrated in FIG. 13.

FIG. 14 is a flowchart illustrating an operation of transmitting state information after the subscription is completed, as illustrated in FIG. 13.

The event receiver 150 may receive an event, e.g., a case in which the state information of at least one device (D) connected to the device interlock interface 140 is changed, (700).

The event processor 160 may check whether the state information change event about the subscribed device (D) is present among the received event (710). When the event about the subscribed device (D) is not present, the event receiver 150 may repeatedly receive an event.

When the event about the subscribed device (D) is present, the event processor 160 may process the state information change event about the subscribed device (D). At the same time, the storage 170 may update the state information of the subscribed device (D) (720).

At last, the event transmitter 180 may transmit the state information of the subscribed device (D) to the user terminal (U) via the partner server (SP) (730). Accordingly, the user may check the event about the state change of the subscribed device (D) without an additional operation.

Figure 15:
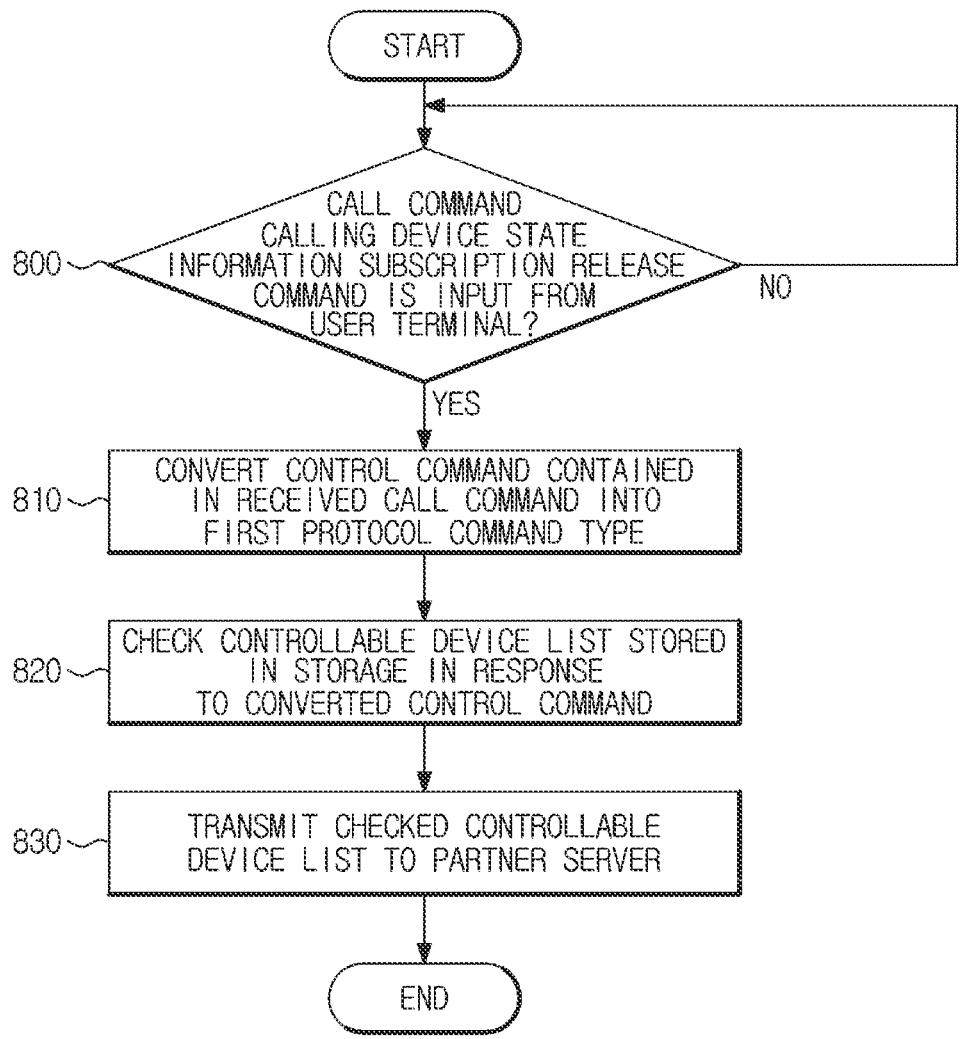
FIG. 15 is a flowchart illustrating an operation when a call command of a device (D) state information subscription release command is received, among the control method of the smart home service server in accordance with an embodiment.

FIG. 15 is a flowchart illustrating an operation when a call command of a device (D) state information subscription release command is received, among the control method of the smart home service server in accordance with an embodiment.

The API controller 110 may confirm whether a call command calling the device (D) state information subscription release command is input via the partner server (SP) from the user terminal (U) (800). In this time, the call command may include information related to a device (D) which wants to release the subscription of the state information. According to an embodiment, the call command may include "Delete Subscriptions (DeviceID)".

When the call command is not input, the API controller 110 may repeatedly confirm whether the call command is input.

In contrast, when the call command is input, the API controller 110 may transmit the control command contained in the received call command, to the filter 120, and the filter 120 may convert the received control command into the first protocol command type (810).

According to the converted control command, the storage 170 may delete the stored subscription of the corresponding device (D) (820). In this time, the controller may determine which device (D) to be released the subscription thereof by using the device (D) information contained in the call command.

After the subscription of the corresponding device (D) is deleted, the event processor 160 may transmit that the subscription is released, to the event transmitter 180, and at last, the event transmitter 180 may transmit that the subscription is released, to the partner server (SP) (830). As a result, the user terminal (U) may receive the information indicating that the subscription is released, from the partner server (SP). Accordingly, the user may visually check that the subscription is released normally, and then when the state information change event of the corresponding device (D) occurs, the occurrence may be not notified to the user terminal (U).

A case in which a condition setting command of the device is called as a control command, will be described with reference to FIGS. 16 and 17.

Figure 16:
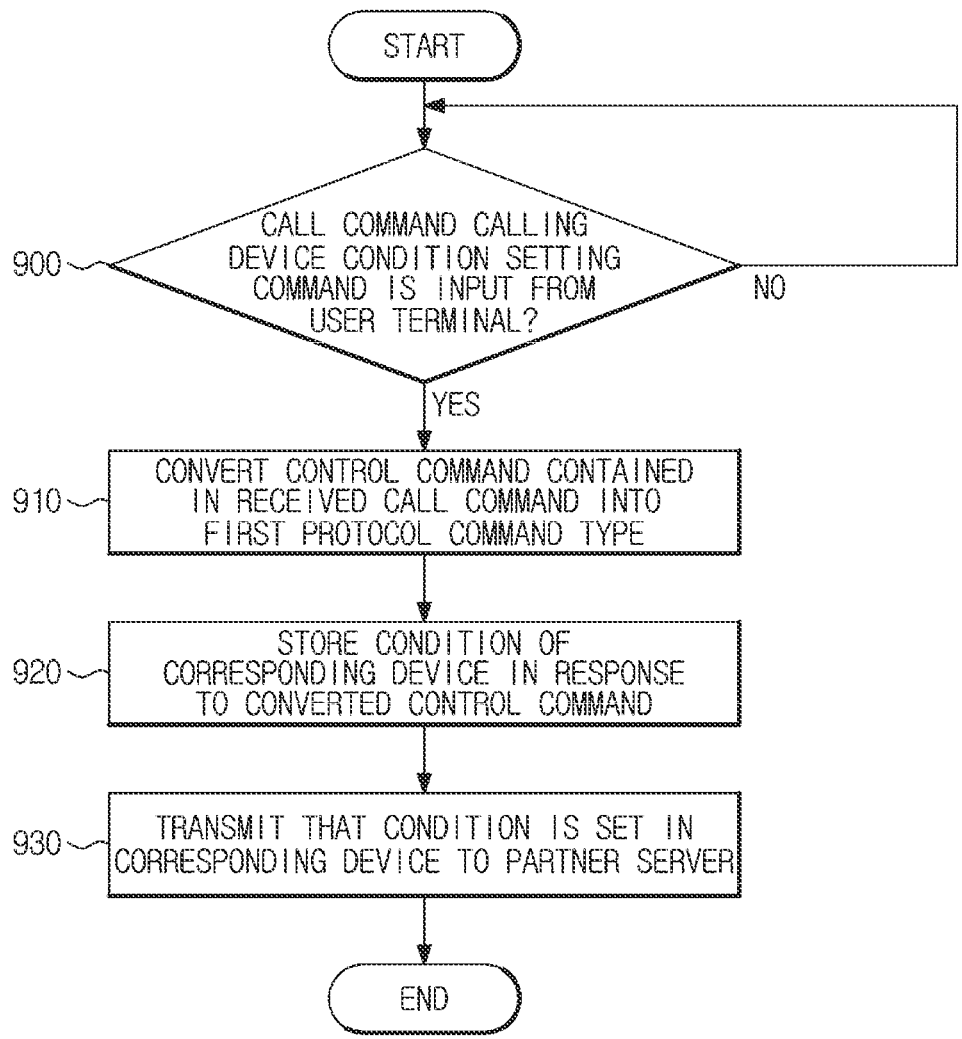
FIG. 16 is a flowchart illustrating an operation when a call command of a device condition setting command is received, among the control method of the smart home service server in accordance with an embodiment.

FIG. 16 is a flowchart illustrating an operation when a call command of a device condition setting command is received, among the control method of the smart home service server in accordance with an embodiment.

The API controller 110 may confirm whether a call command calling the device (D) condition setting command is input via the partner server (SP) from the user terminal (U) (900). In this time, "condition" may represent a threshold value to compare a resource of the device (D). For example, when the device (D) is an air cleaner, the condition may be a threshold of air pollution index. In addition, when the device (D) is an air conditioner, the condition may be a threshold of temperature.

The call command may include information related to a device (D) which wants to set conditions.

When the call command is not input, the API controller 110 may repeatedly confirm whether the call command is input.

In contrast, when the call command is input, the API controller 110 may transmit the control command contained in the received call command, to the filter 120, and the filter 120 may convert the received control command into the first protocol command type (910).

According to the converted control command, the storage 170 may store conditions of the corresponding device (D) (920). In this time, the controller may determine which device (D) in which the condition is stored, by using the device (D) information contained in the call command.

After the condition is stored in the corresponding device (D), the event processor 160 may transmit that the condition is set, to the event transmitter 180 via the filter 120 and at last, the event transmitter 180 may transmit that the condition is set, to the partner server (SP) (930). As a result, the user terminal (U) may receive the information indicating that the condition of the device (D) is set, from the partner server (SP). Accordingly, the user may visually check that the condition is set normally.

Figure 17:
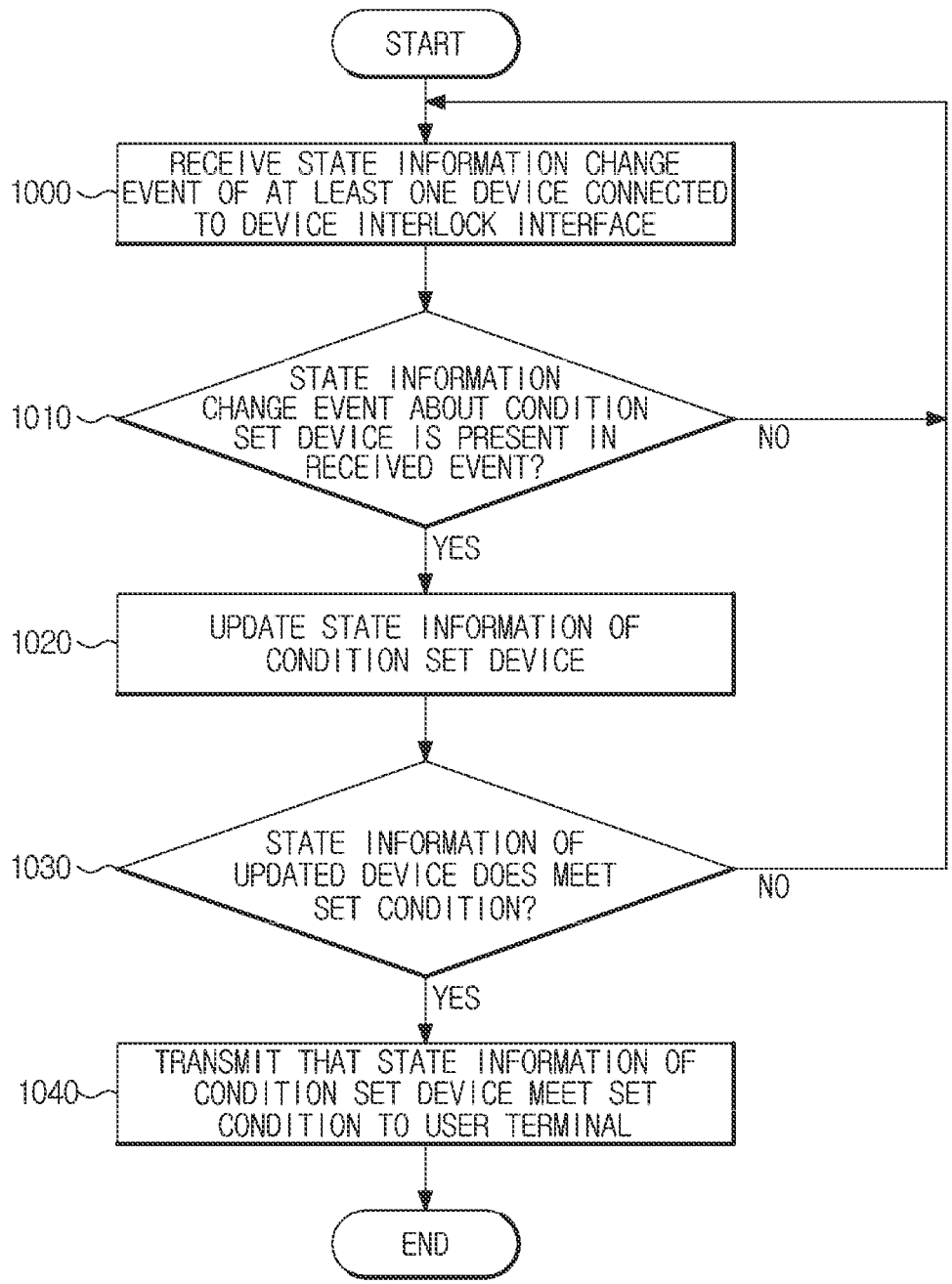
FIG. 17 is a flowchart illustrating an operation of transmitting state information after setting conditions is completed, as illustrated in FIG. 16.

FIG. 17 is a flowchart illustrating an operation of transmitting state information after setting conditions is completed, as illustrated in FIG. 16.

The event receiver 150 may receive an event, e.g., a case in which the state information of at least one device (D) connected to the device interlock interface 140 is changed, (1000).

The event processor 160 may check whether the state information change event about the device (D), in which the condition is set, is present among the received event (1010). When the event about the device (D), in which the condition is set, is not present, the event receiver 150 may repeatedly receive an event.

When the event about the device (D), in which the condition is set, is present, the event processor 160 may process the corresponding event, and the storage 170 may update the state information of the device (D) in which the condition is set (1020).

The event processor 160 may check whether the updated state information of the device (D) meets the condition (1030). When the updated state information of the device (D) does not meet the condition, the event receiver 150 may repeatedly receive an event.

When the updated state information of the device (D) meets the condition, the event transmitter 180 may transmit that the updated device (D) state information meets the set condition, to the user terminal (U) via the partner server (SP) (1040). Accordingly, the user may check that the changed state of the device (D) in which the condition is set, meets the condition, without an additional operation.

As mentioned above, it may be possible to form one single IoT between the device (D) and the user terminal (U) having different type protocols by simultaneously connecting the device (D) and the user terminal (U) to the smart home service server 100. Hereinafter an operation in a single IoT will be described in details with reference to FIG. 18.

Figure 18:
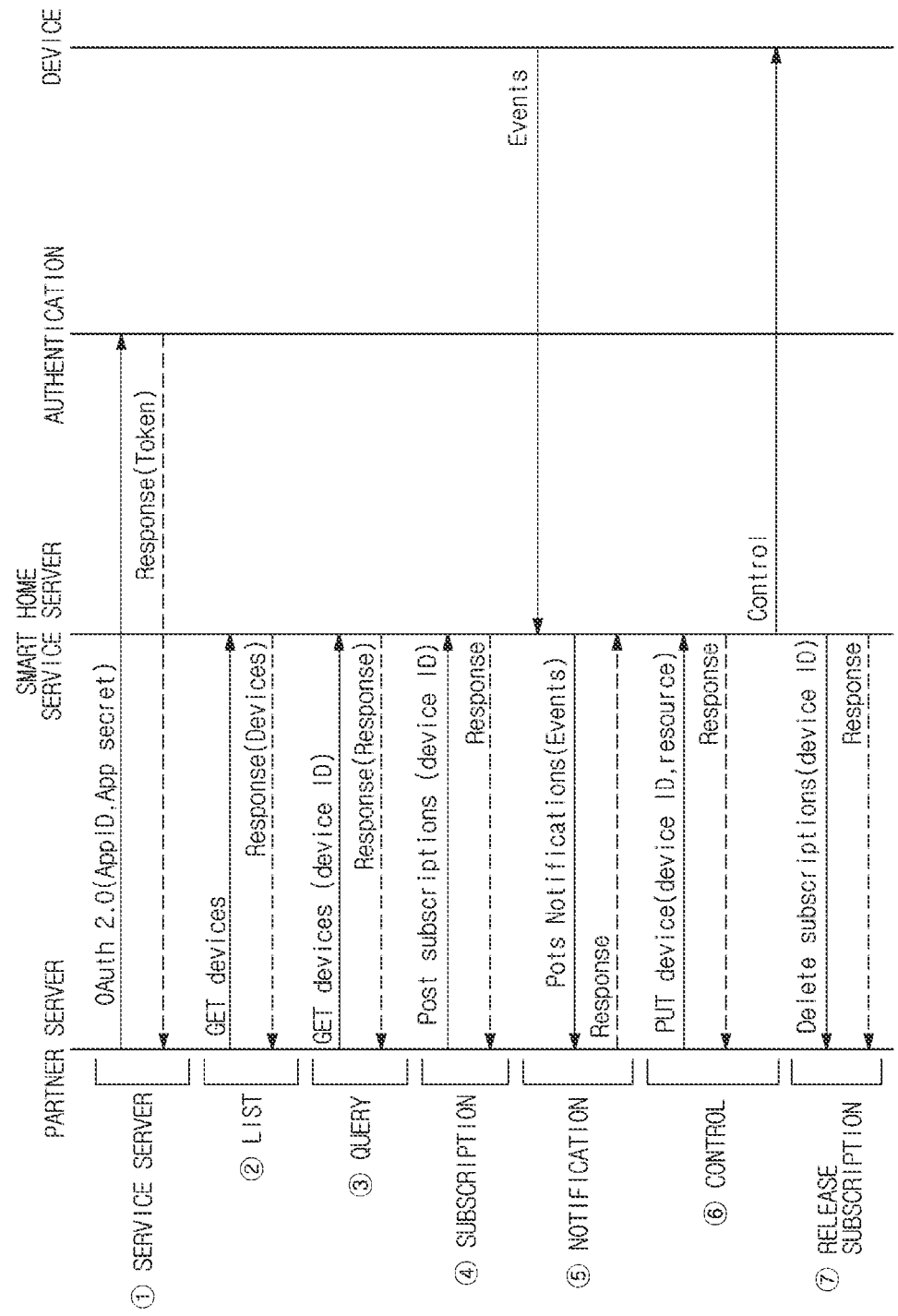
FIG. 18 is a diagram illustrating an operation of the IoT network in accordance with an embodiment.

FIG. 18 is a diagram illustrating an operation of the IoT network in accordance with an embodiment. FIG. 18 illustrates an information exchange flow among the partner server (SP), the smart home service server 100, the authentication server, and the device (D) which form a single IoT network. Hereinafter the operation of the IoT network will be described according to an order of ① authentication—② list generation—③ query—④ subscription—⑤ notification—⑥ control—⑦ release subscription.

In ① authentication, the partner server (SP) may request an authorization to access to the API, to the authentication server according to OAuth 2.0 method. Particularly, the partner server (SP) may request the authentication to the authentication server by using AppID and AppSecurityKey. In response to the request, the authentication server may assign the access token indicating that the authentication is completed, to the partner server (SP). In the following all steps, the partner server (SP) may indicate the authenticated user terminal (U) by adding the access token to the call command calling the control command.

In ② list generation, the authenticated user terminal (U) of the partner server (SP) may transmit the call command calling the controllable device (D) list generation command to the smart home service server 100. According to an embodiment, the call command calling the controllable device (D) list generation command may include "Get devices". In response to the call command, the smart home service server 100 may provide the controllable device (D) list stored in the storage 170, to the partner server (SP) and the user may check the controllable device (D) list via the user terminal (U).

In ③ query, the authenticated user terminal (U) of the partner server (SP) may transmit the call command calling the state information query command for at least one device in the controllable device (D) list. According to an embodiment, the call command calling the state information query command may include "Get devices (DeviceID)". In response to the call command, the smart home service server 100 may provide the state information of the inquired device (D) in the state information of the device (D) stored in the storage 170, to the partner server (SP) and the user may check the state information of the inquired device (D) via the user terminal (U).

In ④ subscription, the authenticated user terminal (U) of the partner server (SP) may transmit the call command calling the subscription request command of the device (D) state information. According to an embodiment, the call command calling the subscription request command of the device (D) state information may include "Post Subscriptions (DeviceID)". In response to the call command, the smart home service server 100 may store that the corresponding device (D) is subscribed, in the storage 170, and the smart home service server 100 may transmit that the corresponding device (D) is subscribed, to the partner server (SP) via the user terminal (U).

In ⑤ notification, when the event of the state information change occurs, the subscribed device (D) may transmit the occurrence to the smart home service server 100. The smart home service server 100 may update the state information of the corresponding device (D) stored in the storage 170, and the smart home service server 100 may notify that the state information is updated, to the user terminal (U) subscribing to the device (D). The user terminal (U) may transmit that the notification is received, to the smart home service server 100 via the partner server (SP).

In ⑥ control, the authenticated user terminal (U) of the partner server (SP) may transmit the call command calling the control command controlling the operation of device (D) in which the state information thereof is confirmed. According to an embodiment, the call command calling the control command controlling the operation of device (D) may include "PUT Device (DeviceID, resource)". In response to the call command, the smart home service server 100 may notify that the corresponding call command is received, to the user terminal (U) and transmit the control command to the device (D). The operation of the device (D) receiving the control command may be controlled by the control command.

In ⑦ release subscription, the authenticated user terminal (U) of the partner server (SP) may transmit the call command calling the subscription release command of the device (D) state information. According to an embodiment, the call command calling the subscription release command of the device (D) state information may include "Delete Subscriptions (DeviceID)". In response to the call command, the smart home service server 100 may delete the subscription of the corresponding device (D) stored in the storage 170, and the smart home service server 100 may transmit that the subscription of the corresponding device (D) is deleted, to the partner server (SP) via the user terminal (U).

Hereinbefore the case of calling the control command of the first protocol from the user terminal (U) of the second protocol, converting the called control command into the first protocol command type, and controlling the device (D) according to the converted control command has been described. Hereinafter a control method of a partner server (SP) of a third protocol and a device (D) connected to the partner server (SP) in the device (D) of the first protocol and the user terminal (D) will be described.

Referring again to FIG. 2, in the adapter 190, the device (D) state information that is processed by the event processor 160 may be called by the partner server (SP) operated based on the third protocol. A detail description thereof will be described with reference to FIG. 19.

Figure 19:
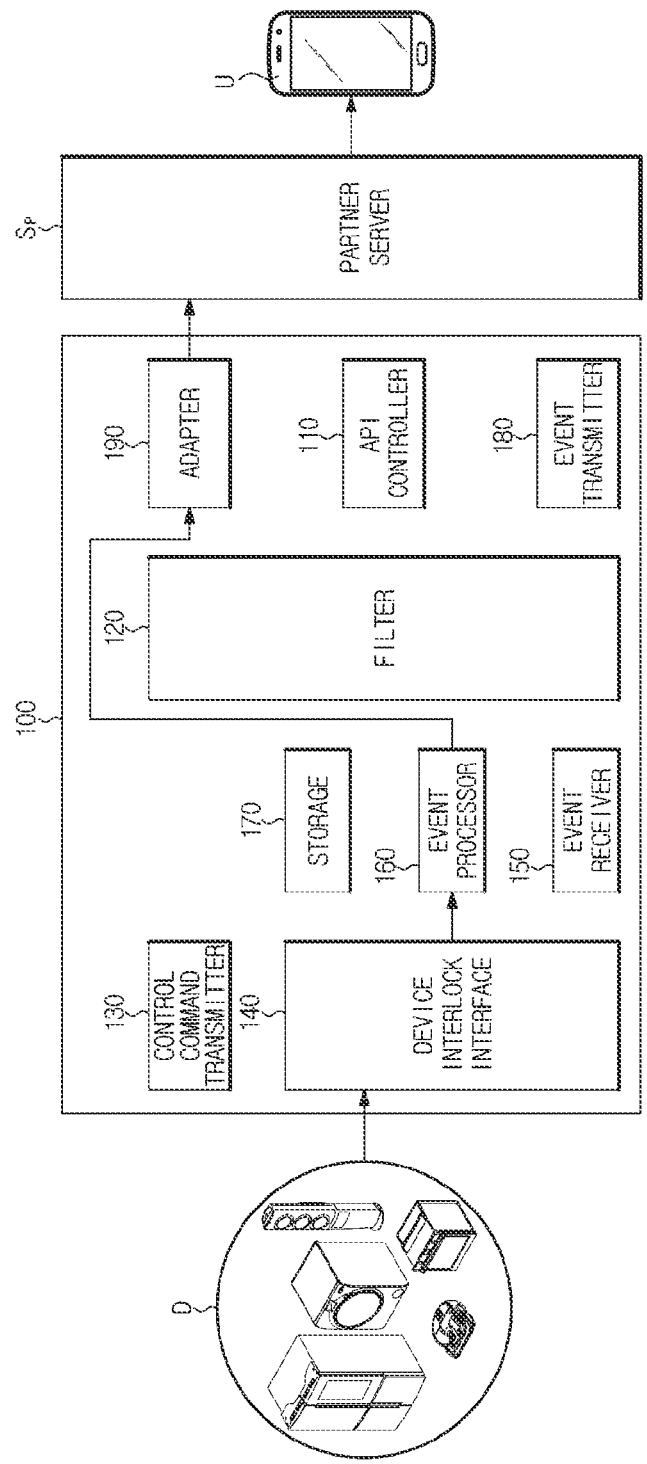
FIG. 19 is a view illustrating an operation of an adapter in accordance with an embodiment.

FIG. 19 is a view illustrating an operation of an adapter in accordance with an embodiment.

Referring to FIG. 19, the event processor 160 which processed the device (D) state information, may provide the processed state information to the adapter 190. In this time, the adapter 190 may convert the provided device (D) state information so that the provided device (D) state information is called in response to the control command of the third protocol.

As a result, it may be possible to easily provide the device (D) state information operated by the first protocol to the partner server (SP) of the third protocol, and when the partner server (SP) of the third protocol is Mashup service provider, it may be possible to control a variety of devices (D) operated by other protocol other than the first protocol, by the device (D) state information.

The adapter 190 may control at least one partner device (D) connected to the partner server (SP) based on the third protocol. For this, the adapter 190 may call a control command for the partner device (D) via the first protocol.

Particularly, the adapter 190 may include an API configured to allow the control command of the third protocol to be called in the first protocol, or an access authority. As a result, the adapter 190 may use the API to call the control command of the third protocol in the first protocol to directly control the partner device (D).

As mentioned above, the smart home service server 100 may provide an environment to allow a bi-directional control between devices having different protocols by having the adapter 190.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:

1. A server operable to connect a home appliance operated based on a first protocol to a mobile terminal operated based on a second protocol, the server comprising:
   an application programming interface (API) controller configured to provide an API for controlling the home appliance to the mobile terminal and receive a call command based on the second protocol from the mobile terminal;
   a filter configured to receive the call command from the API controller and convert the call command to a control command of the home appliance, based on the first protocol, corresponding to the call command;
   a transmitter configured to transmit the control command to the home appliance;
   a device interlock interface connected to the home appliance;
   an event receiver configured to receive state information of the home appliance based on the first protocol via the device interlock interface;
   an event processor configured to provide the state information to the filter and an storage of the server; and
   an event transmitter configured to transmit filtered state information of the home appliance, the filtered state information being converted to the second protocol by the filter,
   wherein the call command comprises:
   authentication information about the second protocol comprising a channel key,
   user authentication information comprising a user ID, an application ID and an access token, and
   device information comprising a device ID of the home appliance.

2. A control method for a server operable to connect a home appliance operated based on a first protocol to a mobile terminal operated based on a second protocol, the control method comprising:
   providing an application programming interface (API) configured to receive a control command of the first protocol in the second protocol, to the mobile terminal;
   obtaining, from the mobile terminal operating based on the second protocol, a control command for the home appliance, by the API controller of the server;
   filtering, by a filter of the server, state information of the home appliance;
   converting the control command according to the first protocol by the filter of the server based on the filtered state information;
   transmitting the control command converted according to the first protocol, to the home appliance, by a control command transmitter of the server;
   receiving the state information of the home appliance, in an event receiver of the server;
   storing the state information in a storage of the server;
   filtering, by the filter of the server, the state information of the home appliance based on authentication information about the second protocol and user authentication information in the control command; and
   transmitting the stored state information to the mobile terminal, in an event transmitter of the server, in response to the obtaining the control command,
   wherein the control command comprises:
   protocol information about the second protocol operated by the mobile terminal, user information for authenticating a user of the mobile terminal, and
   device information corresponding to the home appliance, and wherein the home appliance to be transmitted the control command is determined by the API controller using the device information.

3. The control method of claim 2, wherein the mobile terminal to be transmitted the stored state information is determined based on the user information by the API controller.

* * * * *